(12) United States Patent
Kobayashi

(10) Patent No.: US 11,845,327 B2
(45) Date of Patent: Dec. 19, 2023

(54) ACTUATOR APPARATUS, SUNROOF APPARATUS, AND MANUFACTURING METHOD OF ACTUATOR APPARATUS

(71) Applicant: AISIN CORPORATION, Kariya (JP)

(72) Inventor: Yuki Kobayashi, Kariya (JP)

(73) Assignee: Aisin Corporation, Kariya (JP)

( * ) Notice: Subject to any disclaimer, the term of this patent is extended or adjusted under 35 U.S.C. 154(b) by 267 days.

(21) Appl. No.: 17/150,452

(22) Filed: Jan. 15, 2021

(65) Prior Publication Data

US 2021/0284001 A1  Sep. 16, 2021

(30) Foreign Application Priority Data

Mar. 13, 2020  (JP) ................. 2020-044021

(51) Int. Cl.
*B60J 7/057* (2006.01)
*E05F 15/643* (2015.01)
*F16C 1/12* (2006.01)
*F16H 57/039* (2012.01)
(Continued)

(52) U.S. Cl.
CPC ........... *B60J 7/0573* (2013.01); *E05F 15/643* (2015.01); *F16C 1/12* (2013.01); *F16H 57/031* (2013.01); *F16H 57/039* (2013.01); *E05Y 2201/11* (2013.01); *E05Y 2201/434* (2013.01); *E05Y 2201/654* (2013.01); *E05Y 2201/716* (2013.01); *E05Y 2900/542* (2013.01); *F16C 2326/20* (2013.01); *F16H 2057/02034* (2013.01); *F16H 2057/02082* (2013.01)

(58) Field of Classification Search
CPC ................. B60J 7/0573; E05Y 2900/542
See application file for complete search history.

(56) References Cited

U.S. PATENT DOCUMENTS 5,746,090 A * 5/1998 Boss ................. B60J 7/057
74/89.17
6,431,644 B1  8/2002 Nagashima et al.
(Continued)

FOREIGN PATENT DOCUMENTS

JP  H06-106985 A  4/1994
JP  2000283256 A * 10/2000 ............ B60J 7/0573
(Continued)

OTHER PUBLICATIONS

USPTO FIT Machine Translation of the Description of JP 2000283256 A, Ota et al., Oct. 13, 2000. (Year: 2022).*
(Continued)

*Primary Examiner* — Daniel D Yabut
(74) *Attorney, Agent, or Firm* — Finnegan, Henderson, Farabow, Garrett & Dunner, LLP

(57) ABSTRACT

An actuator apparatus includes a gear housing including an arrangement surface of a drive gear. The arrangement surface is provided at an outer side of the gear housing. The apparatus includes a cover member fixed to the gear housing in a state of covering the drive gear. The apparatus includes a guide member of a drive cable meshing with the drive gear. The guide member is provided to extend in an arrangement direction of the drive cable. The apparatus includes a fixing portion provided at the arrangement surface and configured to fix the guide member relative to the gear housing.

11 Claims, 20 Drawing Sheets

(51) Int. Cl.
F16H 57/031 (2012.01)
F16H 57/02 (2012.01)

(56) References Cited

U.S. PATENT DOCUMENTS

| | | | |
|---|---|---|---|
| 8,240,752 B2 * | 8/2012 | Katayama | B60J 7/022 |
| | | | 296/216.08 |
| 8,348,240 B2 | 1/2013 | Butsuen et al. | |
| 2007/0182219 A1 * | 8/2007 | Mori | B60J 7/0573 |
| | | | 296/223 |

FOREIGN PATENT DOCUMENTS

| | | | |
|---|---|---|---|
| JP | 2001-138747 A | | 5/2001 |
| JP | 2006168531 A | * | 6/2006 |
| JP | 2007223440 A | * | 9/2007 |
| JP | 2008-126732 A | | 6/2008 |
| JP | 2009234337 A | * | 10/2009 |
| WO | WO-2007079740 A1 * | 7/2007 | ............ B60J 7/022 |

OTHER PUBLICATIONS

EPO Machine Translation of JP 2009234337 A, Kanai et al., Oct. 15, 2009. (Year: 2023).*

* cited by examiner

ACTUATOR APPARATUS, SUNROOF APPARATUS, AND MANUFACTURING METHOD OF ACTUATOR APPARATUS

CROSS REFERENCE TO RELATED APPLICATIONS

This application is based on and claims priority under 35 U.S.C. § 119 to Japanese Patent Application 2020-044021, filed on Mar. 13, 2020 the entire content of which is incorporated herein by reference.

TECHNICAL FIELD

This disclosure generally relates to an actuator apparatus, a sunroof apparatus, and a manufacturing method of an actuator apparatus.

BACKGROUND DISCUSSION

A known actuator apparatus used for, for example, a sunroof apparatus of a vehicle may include a drive gear meshing with a drive cable provided with gear teeth. For example, a known actuator apparatus described in JP2001-138747A (which will be hereinafter referred to also as Patent reference 1) includes a gear housing including, at an outer side, an arrangement surface of a drive gear. According to the known actuator apparatus, the gear housing is fixed to a front housing of the sunroof apparatus. The front housing connects guide rails, which are provided as a pair at left and right, to each other. Accordingly, the front housing functions as a cover member covering the drive gear. Further, the known actuator apparatus includes plural pipe members fixed to the front housing. Each of the pipe members is used as a guide member of the drive cable, and accordingly the drive cable is configured to be arranged or routed in a lengthwise direction of the front housing.

In the configuration of the above-described known technique, however, the drive cable driven by the drive gear and sliding in a manner that the drive cable comes out of and into an opening end of the pipe member may possibly interfere with the pipe member due to an assembling error of the pipe member relative to the front housing and/or an assembling error of the gear housing, for example. This may generate sound and/or vibrations, and thus there still remains rooms for improvement in this aspect.

A need thus exists for an actuator apparatus, a sunroof apparatus, and a manufacturing method of an actuator apparatus which are not susceptible to the drawback mentioned above.

SUMMARY

According to an aspect of this disclosure, an actuator apparatus includes a gear housing including an arrangement surface of a drive gear and the arrangement surface is provided at an outer side of the gear housing. The actuator includes a cover member fixed to the gear housing in a state of covering the drive gear. The actuator apparatus includes a guide member of a drive cable meshing with the drive gear. The guide member is provided to extend in an arrangement direction of the drive cable. The actuator apparatus includes a fixing portion provided at the arrangement surface and configured to fix the guide member relative to the gear housing.

According to another aspect of the disclosure, a sunroof apparatus includes an actuator apparatus which includes a gear housing including an arrangement surface of a drive gear, and the arrangement surface is provided at an outer side of the gear housing. The actuator apparatus includes a cover member fixed to the gear housing in a state of covering the drive gear. The actuator apparatus includes a guide member of a drive cable meshing with the drive gear. The guide member is provided to extend in an arrangement direction of the drive cable. The actuator apparatus includes a fixing portion provided at the arrangement surface and configured to fix the guide member relative to the gear housing.

According to another aspect of the disclosure, a manufacturing method of an actuator apparatus includes assembling a cover member relative to a gear housing. The gear housing includes an arrangement surface of a drive gear, the arrangement surface is provided at an outer side of the gear housing, and the cover member is configured to cover the drive gear. The method includes fixing a guide member of a drive cable to the arrangement surface. The drive cable meshes with the drive gear, the guide member is provided to extend in an arrangement direction of the drive cable. The arrangement surface is provided with a press-fitting portion opening in an assembling direction of the cover member relative to the gear housing, and the press-fitting portion serves as a fixing portion configured to fix the guide member to the arrangement surface. The method includes holding the guide member at the cover member before the gear housing and the cover member are assembled to each other, and pressing the guide member, which has been positioned by being held by the cover member, into the press-fitting portion when assembling the gear housing and the cover member to each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
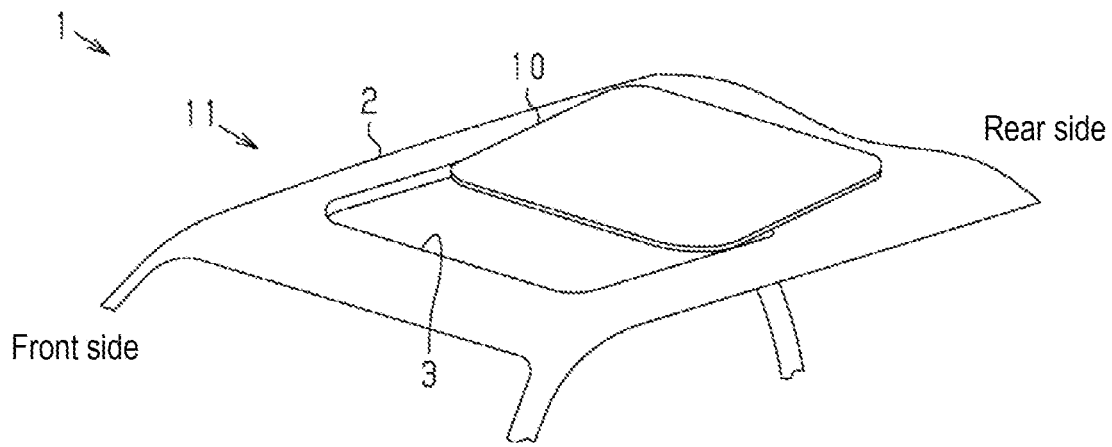
FIG. 1 is a perspective view of a vehicle provided with a sunroof apparatus of a first embodiment disclosed here.

A first embodiment related to an actuator apparatus disclosed here will be described with reference to the drawings. As illustrated in FIG. 1, a roof opening portion 3 formed at a roof panel 2 of a vehicle 1 is provided with a movable panel 10 including a substantially plate shape and configured to open and close the roof opening portion 3. The vehicle 1 of the embodiment includes a sunroof apparatus 11 configured to operate to open and close the movable panel 10.

Figure 2:
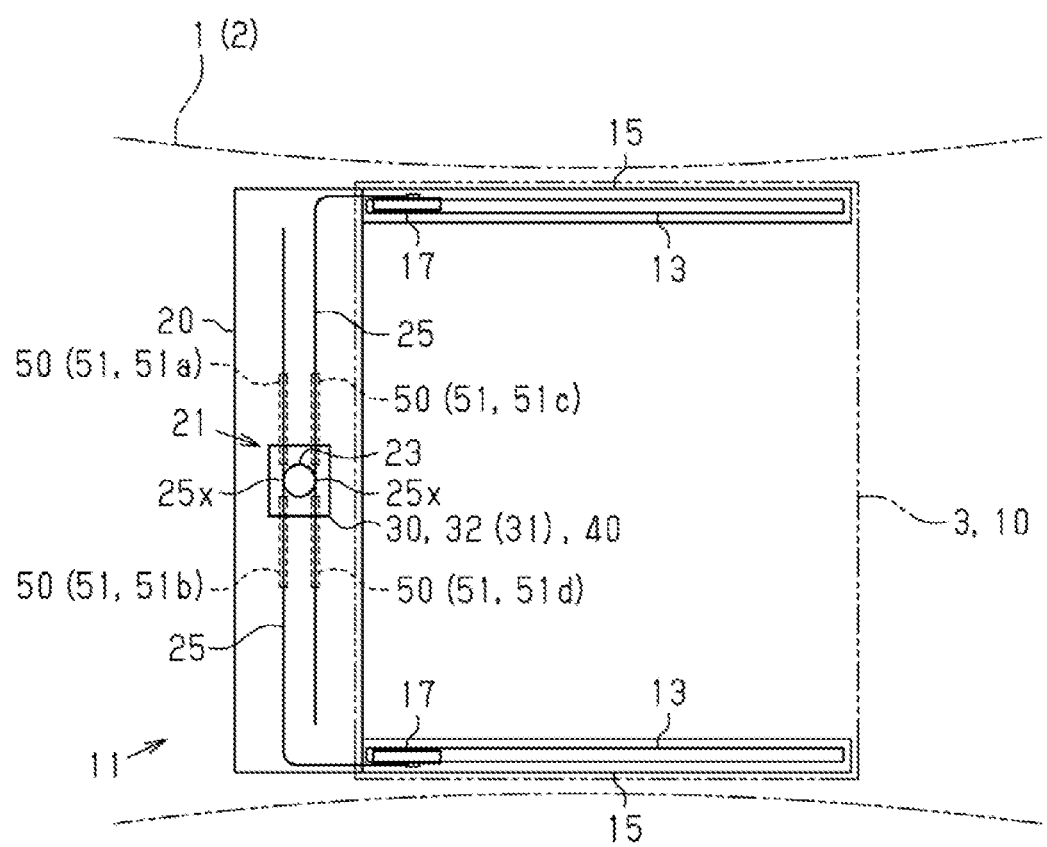
FIG. 2 is a schematic view of the sunroof apparatus.
Figure 3:
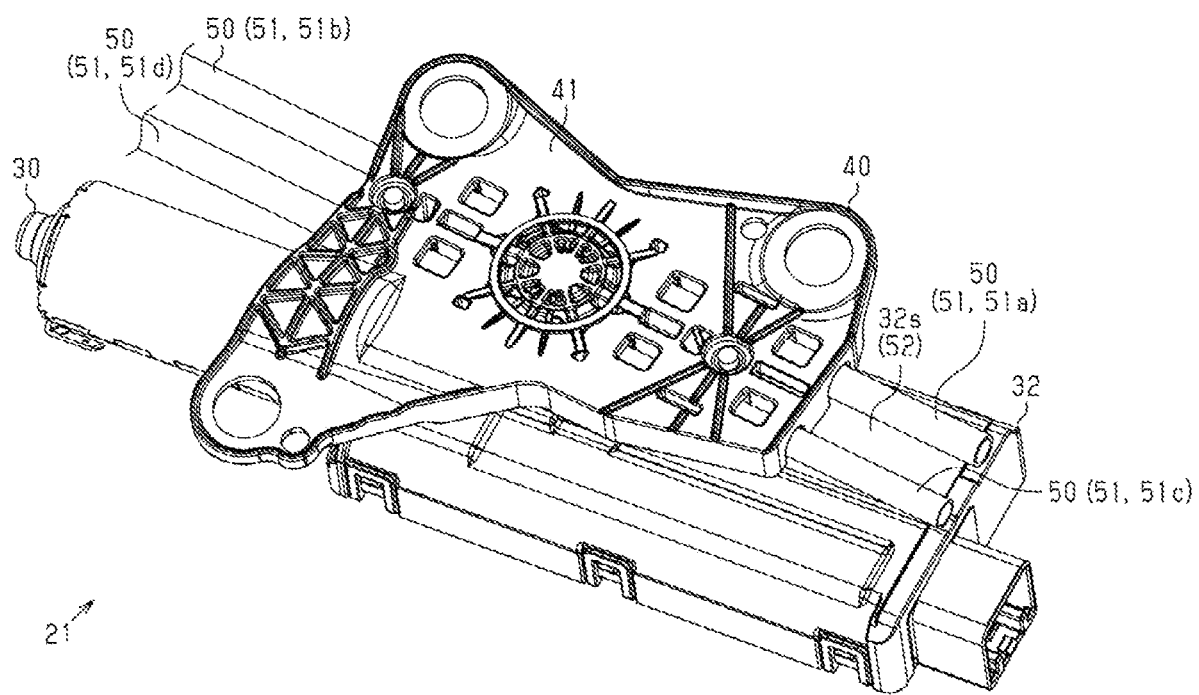
FIG. 3 is a perspective view of an actuator apparatus of the embodiment.
Figure 4:
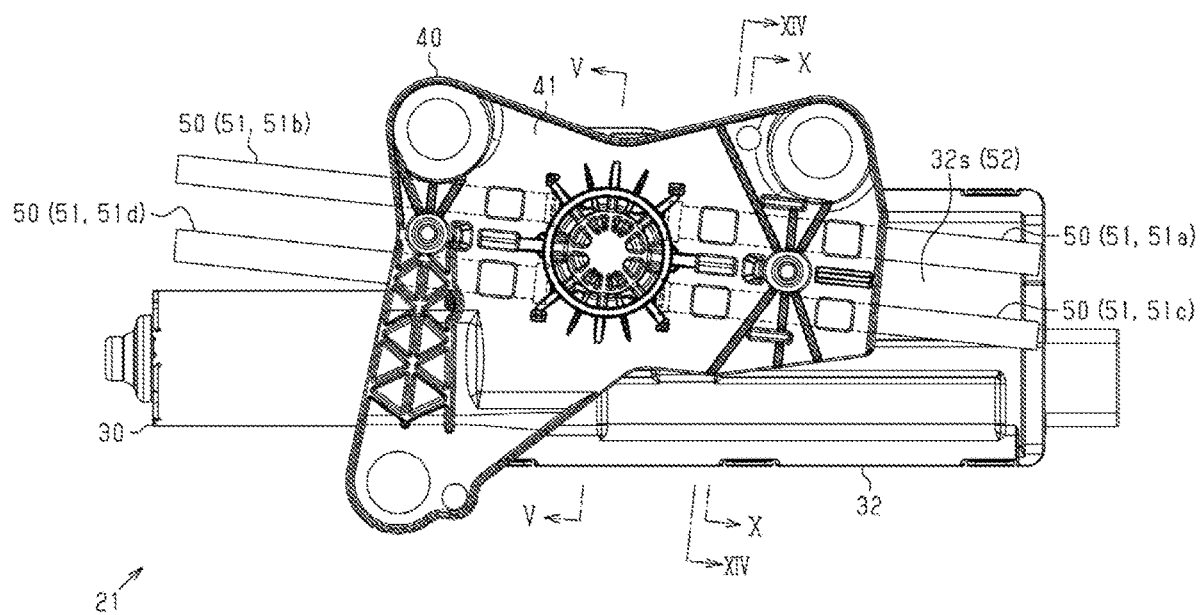
FIG. 4 is a plan view of the actuator apparatus.
Figure 5:
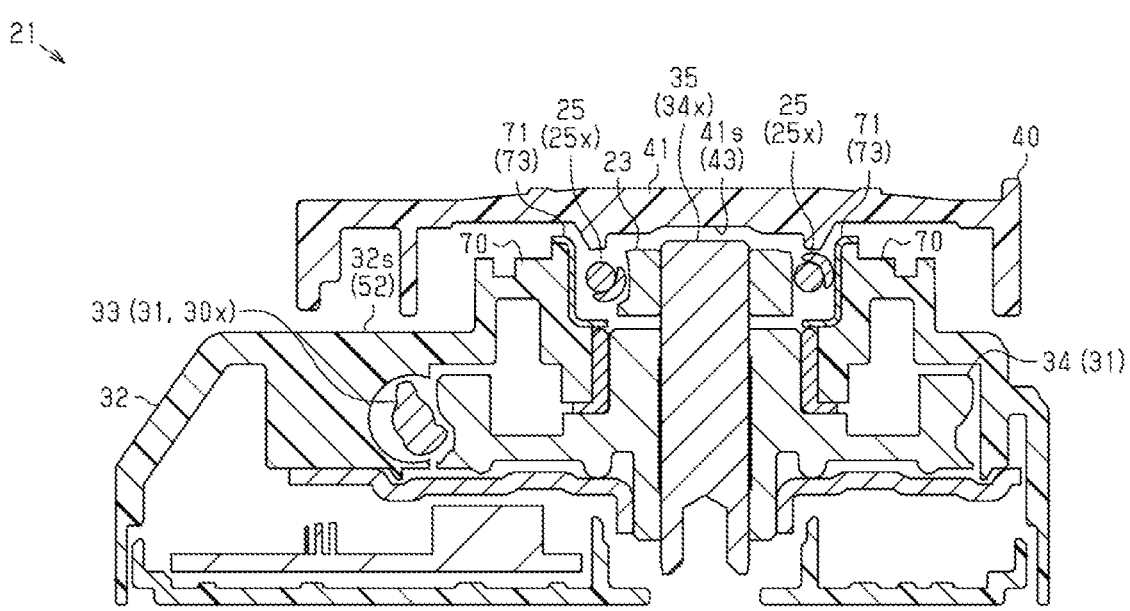
FIG. 5 is a cross-sectional view of the actuator apparatus which is taken along line V-V in FIG. 4.

Specifically, as illustrated in FIG. 2, the sunroof apparatus 11 of the embodiment includes support members 13, 13 provided as a left-and-right pair and supporting the movable panel 10 onto the roof opening portion 3. The sunroof apparatus 11 includes guide rails 15, 15 provided at width-direction end portions of the roof opening portion 3, respectively, so as to extend in a vehicle front and rear direction (the left and right direction in FIG. 2). Thus, the guild rails 15 and 15 are arranged to be apart from each other. The sunroof apparatus 11 includes sliding members 17, 17 provided as a left-and-right pair and sliding along an extending direction of the guide rails 15, 15 in a state where the sliding members 17, 17 are connected to the support members 13, 13, respectively. The sunroof apparatus 11 includes a configuration in which the movable panel 10 performs the opening and closing operation in accordance with the movements of the sliding members 17, 17 and the support members 13, 13.

The sunroof apparatus 11 of the embodiment includes a front housing 20 serving as a connecting housing connecting the left-and-right pair of guide rails 15 and 15 to each other at a vehicle front position (the left side in FIG. 2) of the roof panel 2. The sunroof apparatus 11 includes an actuator apparatus 21 provided at the front housing 20. The sunroof apparatus 11 is configured to cause the sliding members 17, 17 to slide on the basis of a drive force of the actuator apparatus 21, and thus cause the movable panel 10 supported by the support members 13, 13 to perform the opening and closing operation.

In detail, the actuator apparatus 21 of the embodiment includes a drive gear 23 driven by a motor to rotate. The sunroof apparatus 11 includes drive cables 25, 25 provided as a left-and-right pair to be arranged along the lengthwise direction of the front housing 20 and each of the guide rails 15, 15, in a state where the drive cables 25, 25 mesh or engage with the drive gear 23. The drive cables 25, 25 are connected the sliding members 17, 17 provided at the guide rails 15, 15, respectively. Accordingly, the sunroof apparatus 11 includes the configuration in which the drive force of the actuator apparatus 21 is transmitted to each of the sliding members 17, 17.

That is, at the sunroof apparatus 11 of the embodiment, the drive gear 23 of the actuator apparatus 21 rotates, and thus the drive cables 25, 25 each meshing with the drive gear 23 slide along the lengthwise direction of the front housing 20 and the guide rails 15, 15. Accordingly, the sunroof apparatus 11 includes the configuration where the sliding members 17, 17 to which the drive cables 25, 25 are connected move in the vehicle front and rear direction, and thus the movable panel 10 supported by the support members 13, 13 performs a tilt opening-and-closing operation and a slide opening-and-closing operation.

Next, a configuration of the actuator apparatus 21 at the sunroof apparatus 11 of the embodiment will be described.

As illustrated in FIGS. 3 to 6, the actuator apparatus 21 of the embodiment includes a motor 30 serving as a drive source and a gear housing 32 accommodating a deceleration mechanism 31 of the motor 30. The gear housing 32 of the embodiment includes an outer shape of a substantially elongated and flattened rectangular box extended in an axial direction (the left and right direction in FIG. 4) of the motor 30. The gear housing 32 accommodates inside thereof a worm gear 33 provided integrally with an output shaft 30x of the motor 30, a wheel gear 34 meshing with the worm gear 33, which serve as the deceleration mechanism 31. At the actuator apparatus 21, a rotation shaft 34x of the wheel gear 34, which configures an output shaft 35 of the deceleration mechanism 31, is provided to protrude from a side surface 32s of the gear housing 32. The actuator apparatus 21 is configured such that the drive gear 23 is fixed to the output shaft 35 protruding to an outside of the gear housing 32.

The actuator apparatus 21 of the embodiment includes a cover member 40 fixed to the gear housing 32 in a state of covering the drive gear 23 exposed to the outside. Specifically, the cover member 40 of the embodiment is assembled onto the gear housing 32 from an axial direction of the output shaft 35 to which the drive gear 23 is fixed (that is, from the upper side in FIGS. 5 and 6). In the actuator apparatus 21 of the embodiment, the cover member 40 is fastened to the gear housing 32 with the use of a screw member, for example. The cover member 40 includes a top plate portion 41 arranged substantially parallel to the side surface 32s of the gear housing 32 in which the drive gear 23 is arranged. The cover member 40 is configured to form an accommodation space 43 between the top plate portion 41 and the side surface 32s of the gear housing 32, and the drive gear 23 is accommodated in the accommodation space 43.

The actuator apparatus 21 of the embodiment includes plural guide members 50 provided to extend in an arrangement direction of each of the drive cables 25, 25 meshing with the drive gear 23. In detail, as illustrated in FIG. 2, at the sunroof apparatus 11 of the embodiment, each of the drive cables 25, 25 is arranged or routed in a vehicle width direction (the up and down direction in FIG. 2) in which the front housing 20 extends, in a state where the drive cables 25, 25 are arranged side by side in the vehicle front and rear direction. The actuator apparatus 21 is fixed to the front housing 20 in a manner that the drive gear 23 is arranged between the drive cables 25 and 25. The actuator apparatus 21 includes a configuration in which the drive cables 25, 25 mesh with the drive gear 23 from two directions, that is, from the vehicle front side and the vehicle rear side, respectively.

Figure 6:
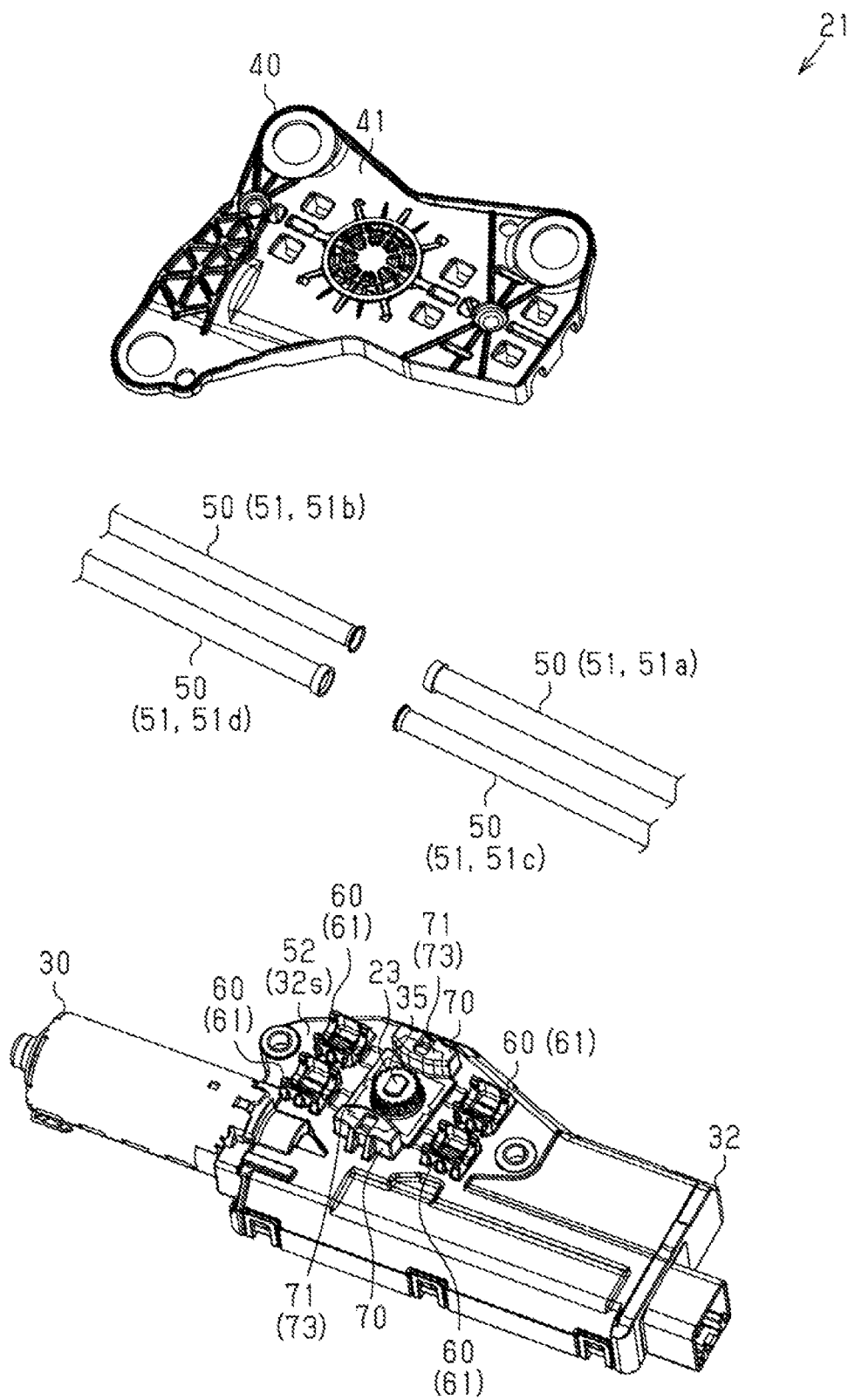
FIG. 6 is an exploded perspective view of the actuator apparatus.
Figure 7:
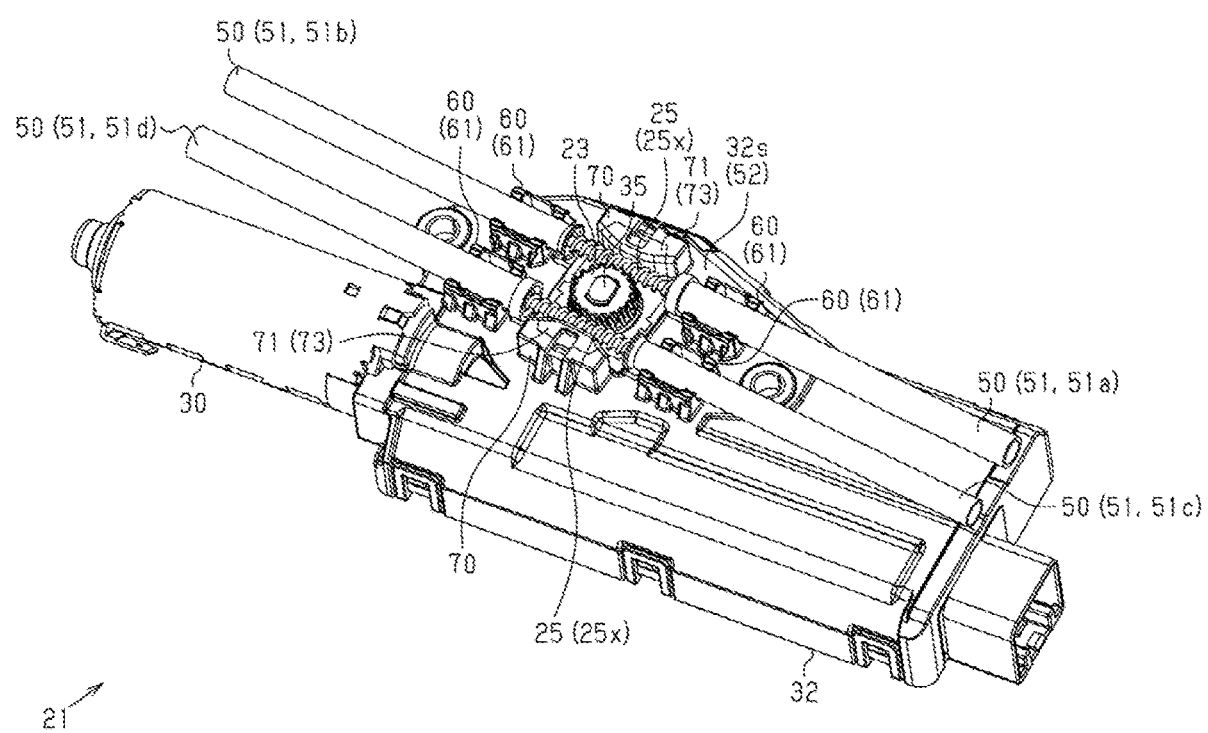
FIG. 7 is a perspective view of the actuator apparatus without a cover member of the embodiment.

As illustrated in FIGS. 2, 6 and 7, the actuator apparatus 21 of the embodiment includes four pipe members 51a, 51b, 51c and 51d serving as the guide member 50. At the actuator apparatus 21, each of the pipe members 51 is fixed to an arrangement surface 52 of the drive gear 23, the arrangement surface 52 which is provided at an outer side of the gear housing 32, in a state where each of the pipe members 51 is extended in a lengthwise direction of the gear housing 32, in more detail, in a state where each of the pipe members 51 is slightly crosses the lengthwise direction of the gear housing 32. The actuator apparatus 21 is fixed to the front housing 20 in a state where the lengthwise direction of the gear housing 32 is laid along the lengthwise direction of the front housing 20, in detail, in a state where the lengthwise direction of the gear housing 32 slightly crosses the lengthwise direction of the front housing 20. At the actuator apparatus 21, each of the pipe members 51 functions as the guide member 50 of each of the drive cables 25, 25 extending in the lengthwise direction of the front housing 20.

Specifically, as illustrated in FIGS. 2 and 7, the pipe members 51a and 51b of the pipe members 51 are arranged at the vehicle front side relative to the drive gear 23 and positioned so as to sandwich the drive gear 23 in the vehicle width directions in a state where the actuator apparatus 21 is fixed to the front housing 20. The pipe members 51c and 51d are arranged at the vehicle rear side relative to the drive gear 23 and positioned so as to sandwich the drive gear 23 in the vehicle width directions in the state where the actuator apparatus 21 is fixed to the front housing 20. One of the drive cables 25 and 25 is inserted inside the pipe members 51a and 51b and the other is inserted inside the pipe members 51c and 51b. In the configuration of the actuator apparatus 21, each of the drive cables 25, 25 includes a meshing portion 25x at which the drive cable 25 meshes with the drive gear 23, and the meshing portions 25x, 25x are formed between the pipe member 51a and the pipe member 51b and between the pipe member 51c and the pipe member 51d, respectively.

Figure 8:
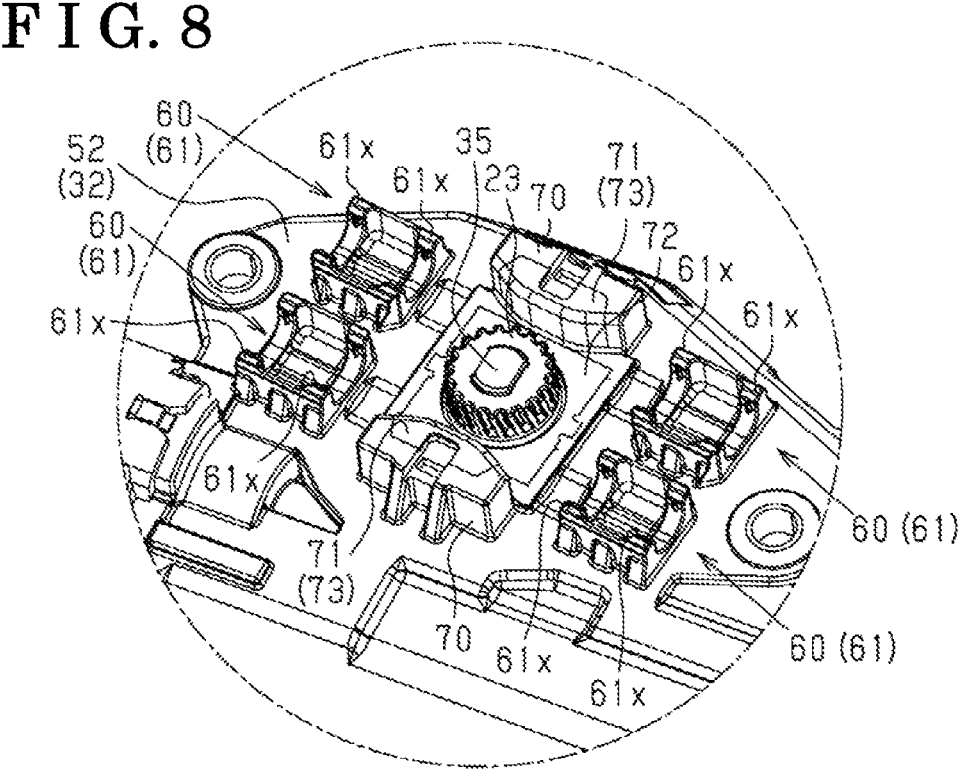
FIG. 8 is a perspective view of the vicinity of a fixing portion of a guide member provided at an arrangement surface of a drive gear according to the embodiment.
Figure 9:
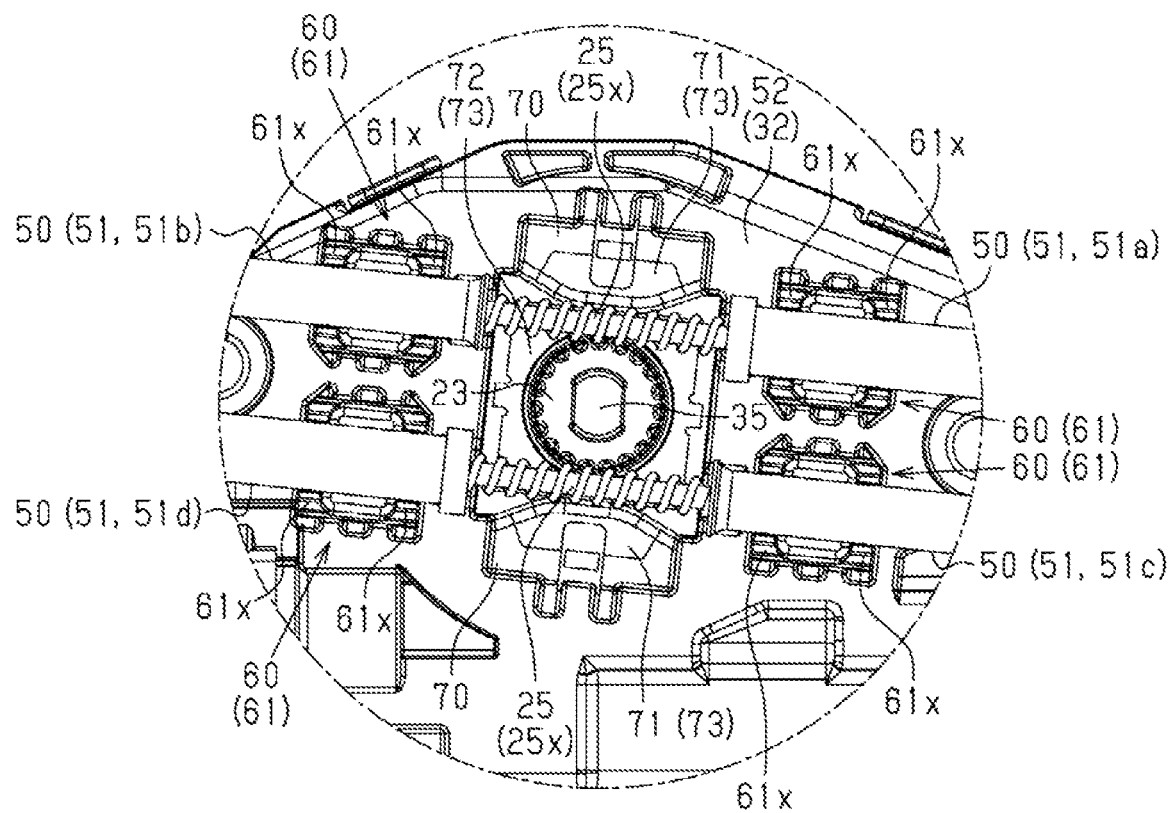
FIG. 9 is a plane view of the vicinity of the fixing portion of the guide member provided at the arrangement surface of the drive gear.
Figure 10:
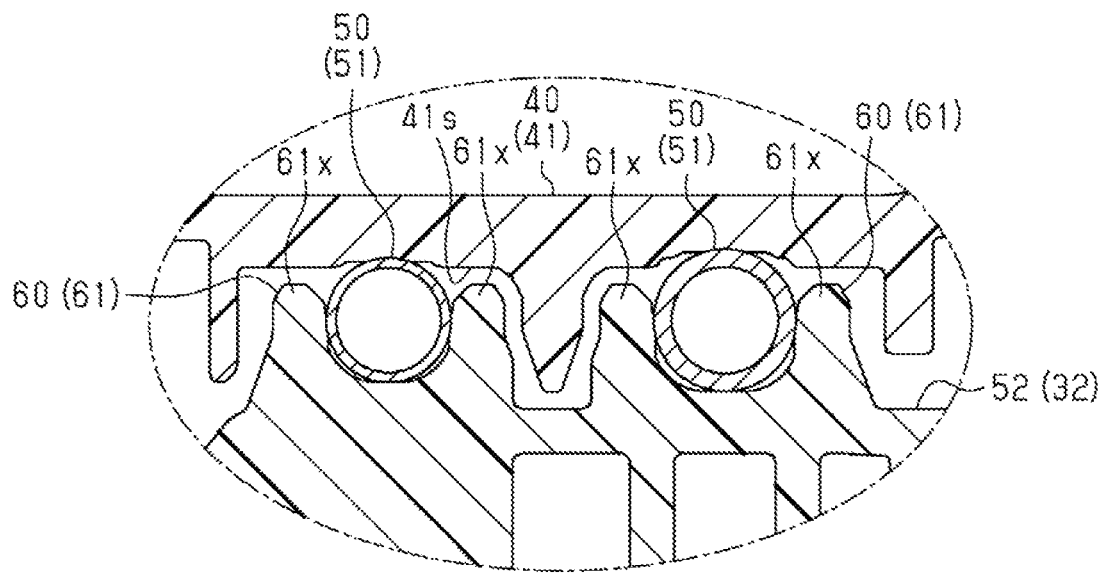
FIG. 10 is a cross-sectional view of the actuator apparatus which is taken along line X-X in FIG. 4.
Figure 11:
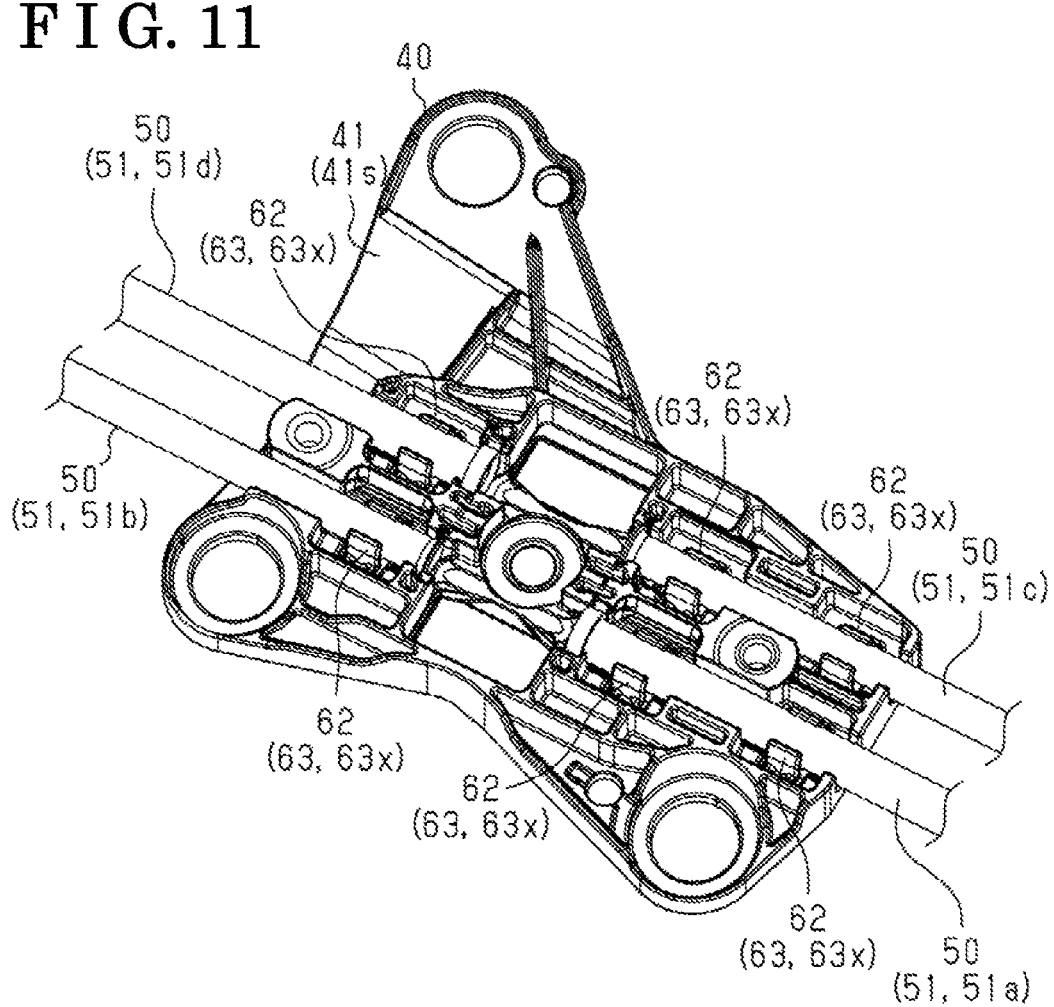
FIG. 11 is a perspective view of the guide member held at the cover member.
Figure 12:
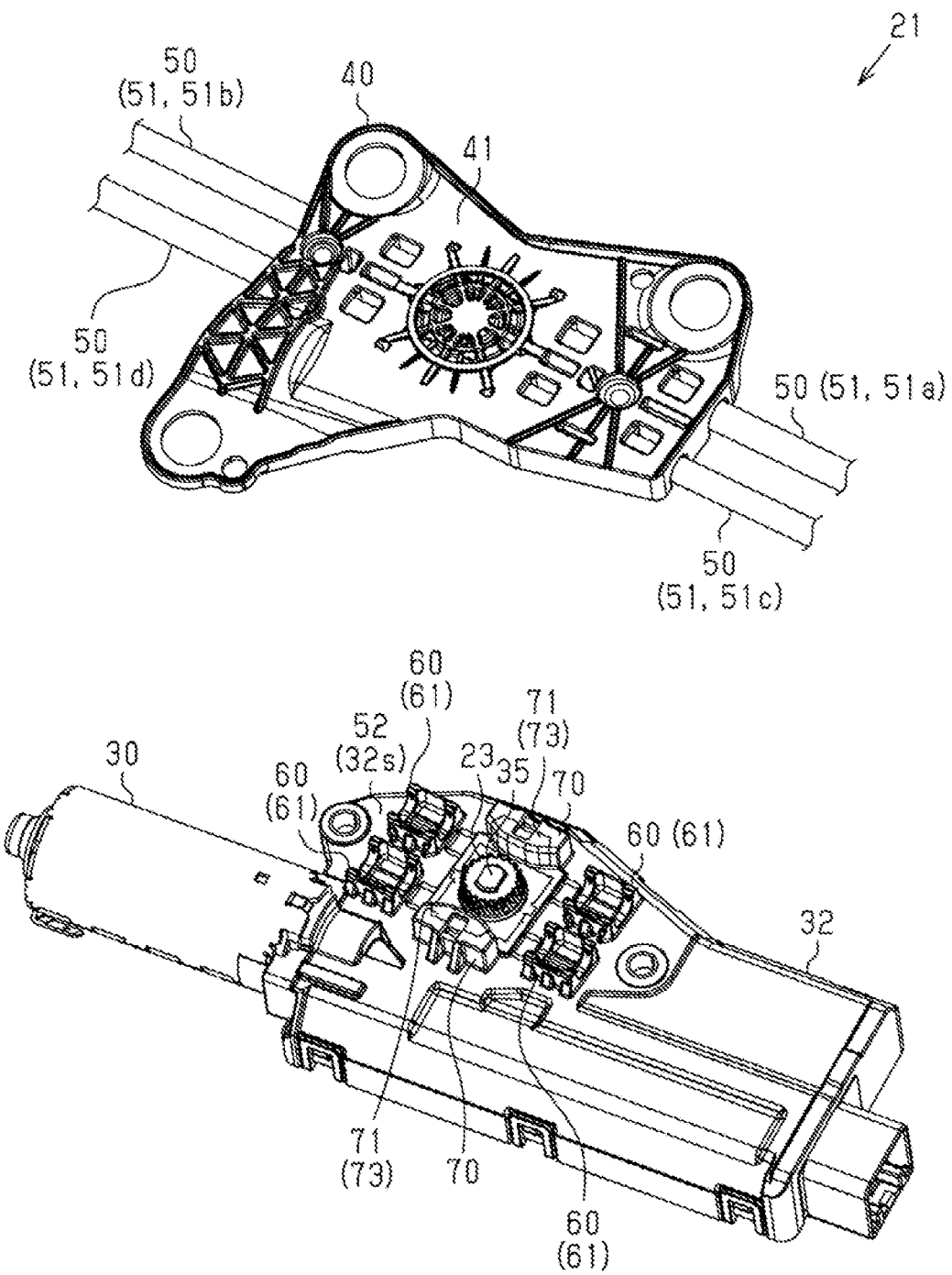
FIG. 12 is a perspective view illustrating an assembling process of the cover member and the guide member relative to a gear housing of the embodiment.
Figure 13:
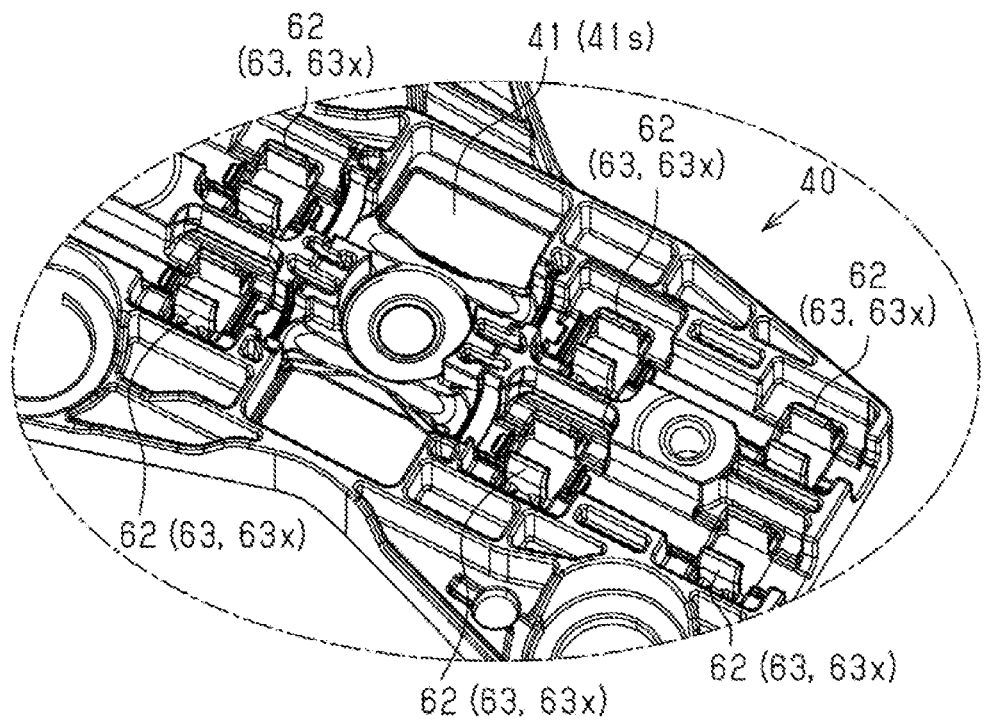
FIG. 13 is a perspective view of the vicinity of a holding portion provided at the cover member according to the embodiment.
Figure 14:
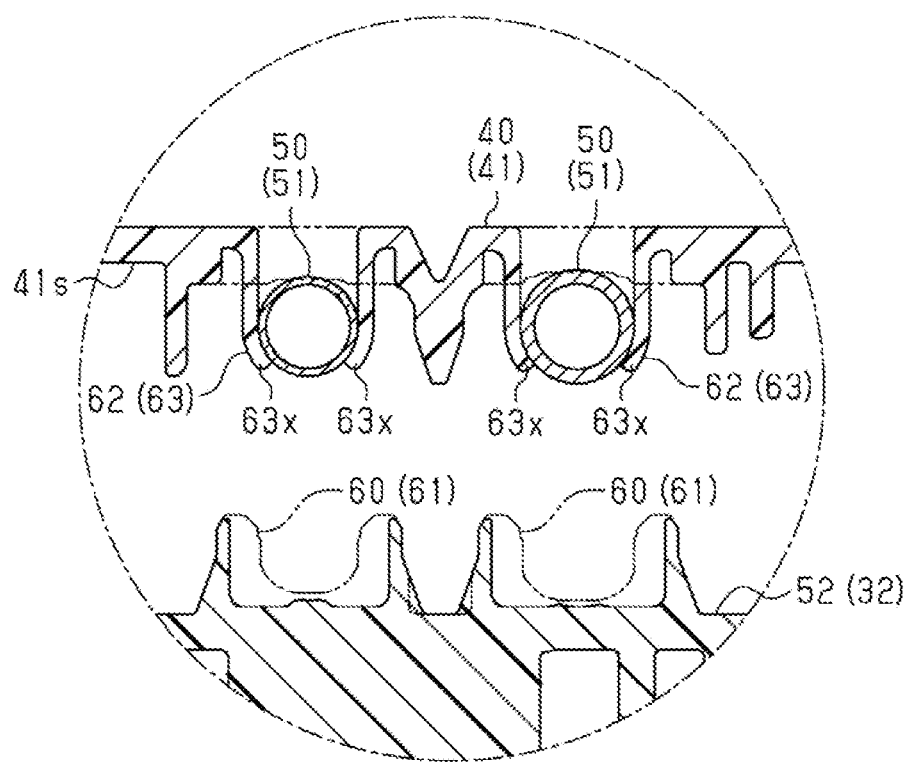
FIG. 14 is a cross-sectional view illustrating the assembling process of the cover member and the guide member relative to the gear housing which is taken along line XIV-XIV in FIG. 4.

In more detail, as illustrated in FIGS. 8 to 10, in the actuator apparatus 21 of the embodiment, a fixing portion 60 of each of the pipe members 51 relative to the gear housing 32 is provided on the arrangement surface 52 of the drive gear 23, and each of the fixing portions 60 includes a configuration as a press-fitting portion 61 pressing the pipe member 51 in a radial direction and thereby causing the pipe member 51 to fit therein.

Specifically, the gear housing 32 of the embodiment includes four of the fixing portions 60 protrudingly provided on the arrangement surface 52, at positions in the vicinity of the drive gear 23 so as to correspond to the respective pipe members 51. Each of the fixing portions 60 includes an outer shape having a substantially U-shaped cross section opening in an assembling direction (the upper side in FIG. 10) in which the cover member 40 is assembled onto the gear housing 32, that is, in the axial direction of the output shaft 35 to which the drive gear 23 is fixed. In detail, each of the fixing portions 60 serving as the press-fitting portion 61 includes two sets of pairs of engagement tabs 61x, 61x. Each pair of the engagement tabs 61x, 61x fits or mates with the pipe member 51 in a manner that the pipe member 51 is held and fits in the substantial U-shape formed by the engagement tabs 61x, 61x in a sandwiched manner. Thus, in a manner that each of the pipe members 51 is pressed or pushed against the fixing portion 60 protruding from the arrangement surface 52 of the drive gear 23, the gear housing 32 allows the pipe members 51 to fit in or mate with the fixing portions 60 including the configuration as the press-fitting portions 60.

As illustrated in FIGS. 11 to 14, at the actuator apparatus 21 of the embodiment, holding portions 62 are provided at the top plate portion 41 of the cover member 40 to be arranged at a back surface 41s opposing the arrangement surface 52 of the drive gear 23. Each of the holding portions 62 is configured to hold thereat the pipe member 51.

Specifically, the cover member 40 of the embodiment includes plural of the holding portions 62 provided in a protruding manner at the back surface 41s of the top plate portion 41. The holding portions 62 are provided at positions that do not interfere with the fixing portions 60 provided at the gear housing 32 in a state where the cover member 40 is assembled on the gear housing 32. For example, at the cover member 40, each of the holding portions 62 is formed at a position corresponding to between, in a lengthwise direction of the pipe member 51 held at the back surface 41s of the top plate portion 41, the two sets of pairs of engagement tabs 61x, 61x configuring the press-fitting portion 61. Each of the holding portions 62 of the actuator apparatus 21 is configured as a fitting portion 63 including an outer shape of a substantially U-shaped cross section in a similar manner to each of the press-fitting portions 60 of a gear housing-side. In detail, each of the fitting portions 63 includes a pair of engagement tabs 63x, 63x and the pipe member 51 is held in the substantial U-shape formed by the engagement tabs 63x, 63x, in a sandwiched manner. At the actuator apparatus 21, a force with which each of the holding portions 62 holds the pipe member 51 is set to be weaker or smaller than a force with which each of the press-fitting portions 61, which configures the fixing portion 60 at a gear housing-side, retains the pipe member 51.

Figure 15:
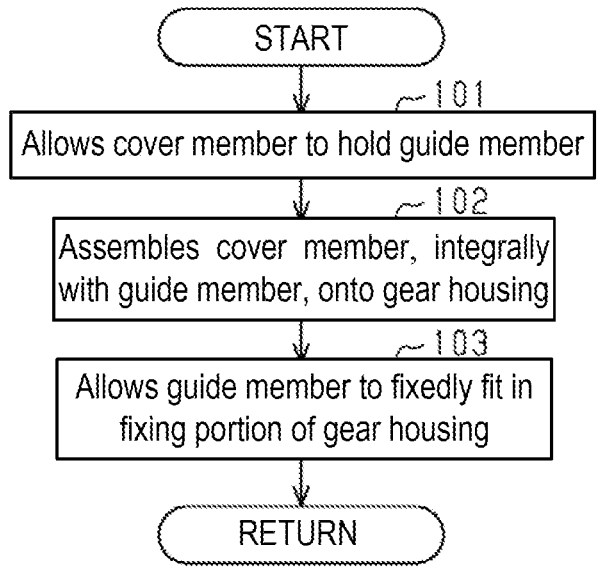
FIG. 15 is a flowchart showing a manufacturing method of the actuator of the embodiment.

That is, as illustrated in the flowchart of FIG. 15, the actuator apparatus 21 of the embodiment allows each of the pipe members 51 serving as the guide member 50 to fit relative to the holding portion 62 provided at the back surface 41s of the top plate portion 41 of the cover member 40 before the cover member 40 is assembled onto the gear housing 32 (Step 101). Next, the cover member 40 is assembled onto the gear housing 32 integrally with each of the pipe members 51 that are held at the back surface 41s of the top plate portion 41 and thus are positioned (Step 102). At this time, each of the pipe members 51 held at the cover member 40 is allowed to fit in the corresponding fixing portion 60 that is configured as the press-fitting portion 61 and is provided at a gear housing-side, by utilizing a force with which the top plate portion 41 is pressed or pushed towards the arrangement surface 52 of the drive gear 23 (Step 103). Consequently, at the actuator apparatus 21 of the embodiment, each of the pipe members 51 is fixed relative to the arrangement surface 52 of the drive gear 23 at the same time as the cover member 40 is assembled onto the gear housing 32.

Figure 16:
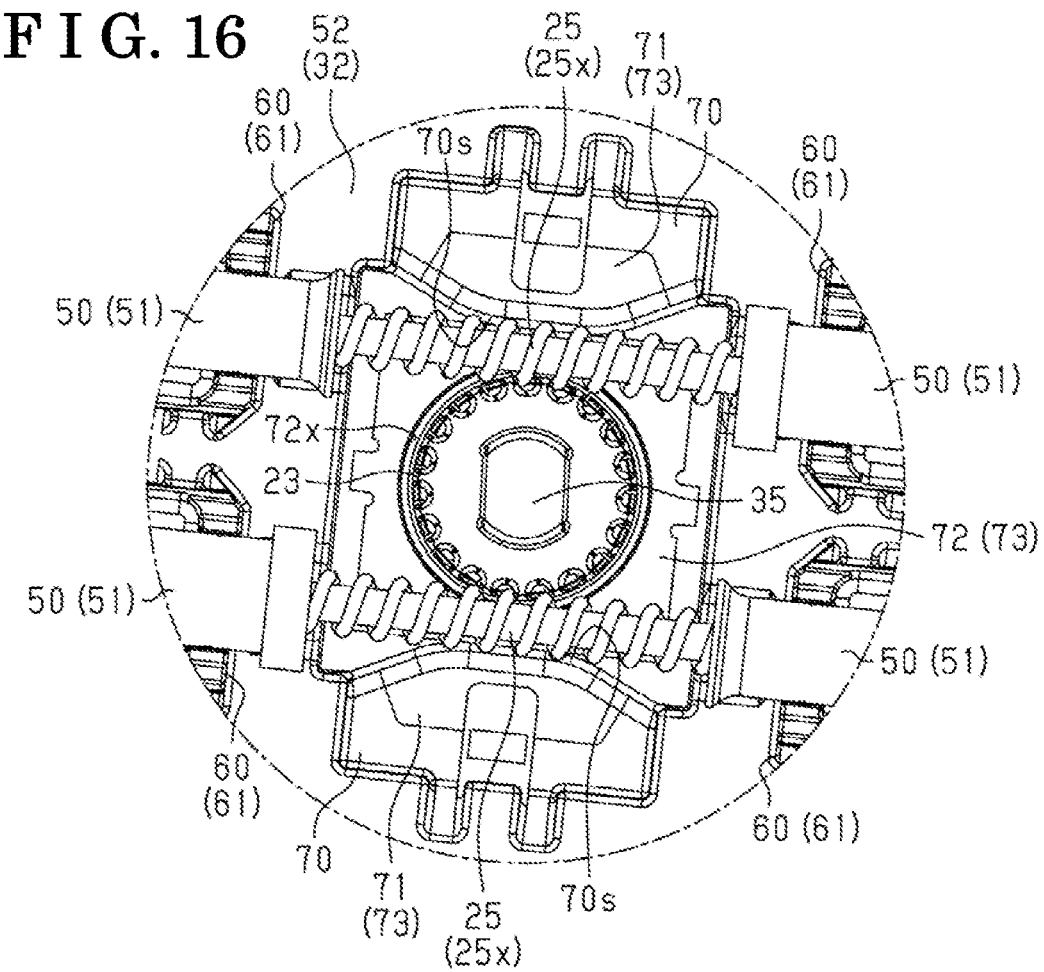
FIG. 16 is a plan view of the vicinity of the drive gear.

As illustrated in FIGS. 8 and 16, the gear housing 32 of the embodiment includes a pair of cable retaining portions 70, 70 provided at the arrangement surface 52 of the drive gear 23 in a protruding manner. In a state where the actuator apparatus 21 is fixed to the front housing 20, the cable retaining portions 70, 70 are positioned so as to sandwich the drive gear 23 in the vehicle front and rear direction (the up and down direction in each of the drawings.

Figure 17:
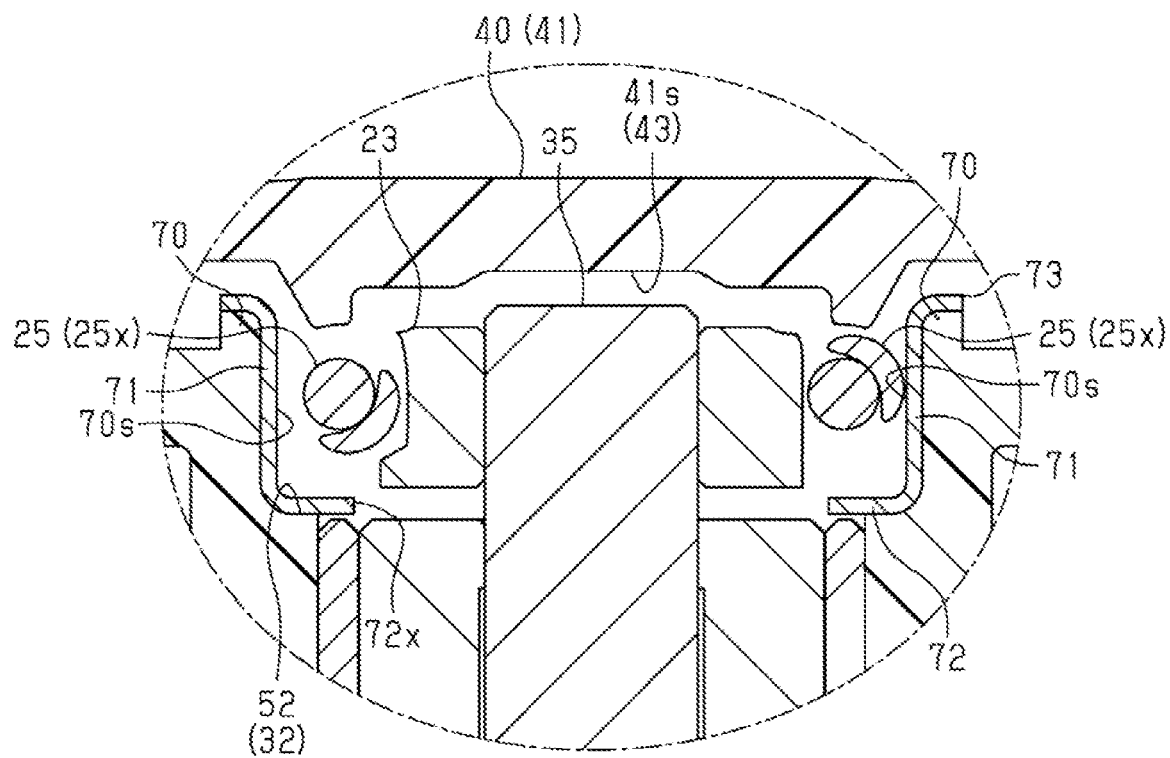
FIG. 17 is a cross-sectional view of the vicinity of the drive gear.

Specifically, as illustrated in FIGS. 16 and 17, each of the cable retaining portions 70, 70 includes a retaining surface 70s facing the drive gear 23 in a radial direction of the drive gear 23. Each of the retaining surfaces 70s, 70s is extended in the arrangement direction of each of the drive cables 25, 25 meshing with the drive gear 23. Each of the retaining surfaces 70s, 70s includes a configuration of a curved surface having a substantially bow shaped cross section in which a central portion of the retaining surface 70s in its extending direction along the drive cable 25 is closest to the drive gear 23. The actuator apparatus 21 includes a pair of sliding-contact members 71, 71 forming the retaining surfaces 70s, 70s of the cable retaining portions 70, 70 in a state of being buried in the gear housing 32.

Figure 18:
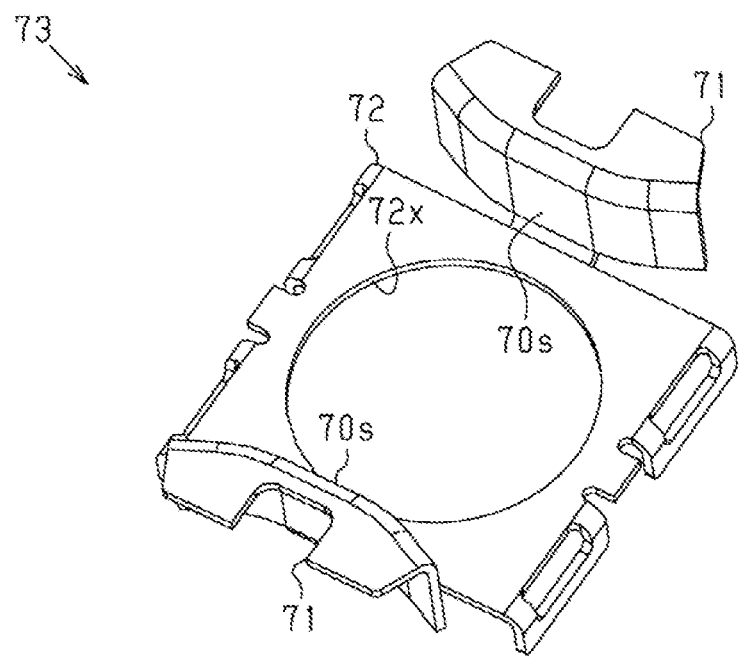
FIG. 18 is a perspective view of an insert member in which sliding-contact members and a base member are integrated with each other according to the embodiment.

In detail, as illustrated in FIGS. 17 and 18, at the actuator apparatus 21 of the embodiment, each of the sliding-contact members 71, 71 is formed by plastic-working metal plate material to be integral with a base member 72 provided to lay on the arrangement surface 52. The sliding-contact members 71, 71 are positioned adjacent to the drive gear 23. The base member 72 of the embodiment includes an outer shape of a substantially plate shape provided with a hole portion 72x into which the rotation shaft 34x of the wheel gear 34 is inserted. The gear housing 32 of the embodiment includes a configuration as a resin molded part. The sliding-contact members 71, 71 include a configuration as an insert member 73 formed integrally with the gear housing 32 together with the base member 72 connecting the sliding-contact members 71, 71 to each other.

That is, at the actuator apparatus 21 of the embodiment, in a state where the sliding-contact members 71, 71 are integral with the gear housing 32 via the insert-molding, each of the sliding-contact members 71, 71 is positioned such that the meshing portion 25x (the meshing portion 25x meshes with the drive gear 23) of the drive cable 25 is interposed or sandwiched between the sliding-contact member 71 and the drive gear 23. According to the configuration of the actuator apparatus 21 of the embodiment, the meshing portions 25x, 25x of the drive cables 25, 25 slidingly contact with the retaining surfaces 70s, 70s of the cable retaining portions 70, 70 formed by the sliding-contact members 71, 71, and accordingly each of the drive cables 25, 25 is assured to mesh with the drive gear 23 in a satisfactory meshing state.

The drive gear 23 of the embodiment includes a stepped portion which has a flange shape and is provided to protrude radially outwardly from an axial direction end portion of the drive gear 23 at a side of the arrangement surface 52. At the actuator apparatus 21 of the embodiment, arrangement of each of the drive cables 25, 25 in the axial direction of the output shaft 35 is defined by the stepped portion and the top plate portion 41 of the cover member 40.

Next, operation of the embodiment will be described. According to the actuator apparatus 21 of the embodiment, the pipe members 51 configuring the guide members 50 of the drive cables 25, 25 are fixedly attached to the arrangement surface 52 of the drive gear 23 that is provided at the outer side of the gear housing 32. A positional relationship between the guide members 50 and the drive gear 23 does not easily change even in a case where an assembling error of the cover member 40 relative to the gear housing 32 and/or an assembling error of the gear housing 32 relative to the front housing 20 occurs. Since the guide members 50 are fixed at the positions close to the drive gear 23, also an assembling error of the guide members 50 gives small effect to the positional relationship between the guide members 50 and the drive gear 23.

Next, effects of the embodiment will be described. (1) The actuator apparatus 21 includes the gear housing 32 including the arrangement surface 52 of the drive gear 23. The arrangement surface 52 is provided at the outer side of the gear housing 32. The actuator apparatus 21 includes the cover member 40 fixed to the gear housing 32 in a state where the cover member 40 covers the drive gear 23, and the guide members 50 provided to extend in the arrangement direction of the drive cables 25, 25 meshing with the drive gear 23. The actuator apparatus 21 includes the fixing portions 60 fixing the guide members 50 relative to the gear housing 32. The fixing portions 60 are provided at the arrangement surface 52 of the drive gear 23.

According to the above-described configuration, the arrangements of the guide members 50 relative to the drive gear 23 are not easily displaced or deviated. Thus, the guide members 50 and the drive cables 25 are prevented from interfering with each other.

(2) The fixing portion 60 provided at the arrangement surface 52 of the drive gear 23 for fixing the guide member 50 includes the configuration as the press-fitting portion 61 opening in the assembling direction of the cover member 40 relative to the gear housing 32. The cover member 40 includes the holding portions 62 holding therein the guide member 50 and thereby positioning the guide member 50 relative to the press-fitting portion 61 provided at a gear housing side.

According to the above-described configuration, the guide members 51 are fixed to the arrangement surface 52 of the drive gear 23 at the same time as when the cover member 40 is assembled onto the gear housing 32. This allows the assembling work to be easier, thereby reducing manufacturing costs.

(3) The actuator apparatus 21 include the sliding-contact member 71 provided at the position at which the sliding-contact member 71 sandwiches the meshing portion 25x (the meshing portion 25x meshes with the drive gear 23) of the drive cable 25 between the sliding-contact member 71 and the drive gear 23. The gear housing 32 includes the configuration as the resin molded part. The sliding-contact member 71 includes the configuration as the insert member 73 molded integrally with the gear housing 32.

That is, by forming the sliding-contact member 71 and the gear housing 32 to be integral with each other via the insert-molding, the assembling work can be simplified and the manufacturing costs may be reduced. Further, since the sliding-contact member 71 is integral with the gear housing 32, the retaining surface 70s for the drive cable 25 which is high in stability and rigidity is formed. Accordingly, by utilizing the small positional displacement or deviation between the guide members 50 of the drive cables 25 and the drive gear 23, the satisfactory meshing state of the drive gear 23 and the drive cables 25, 25 can be ensured.

A second embodiment related to the actuator apparatus disclosed here will be described with reference to the drawings. In the explanation of the second embodiment, the configuration which is similar to or same as the first embodiment bears the same reference numeral, and the explanation thereof will be omitted for convenience of the explanation.

Figure 19:
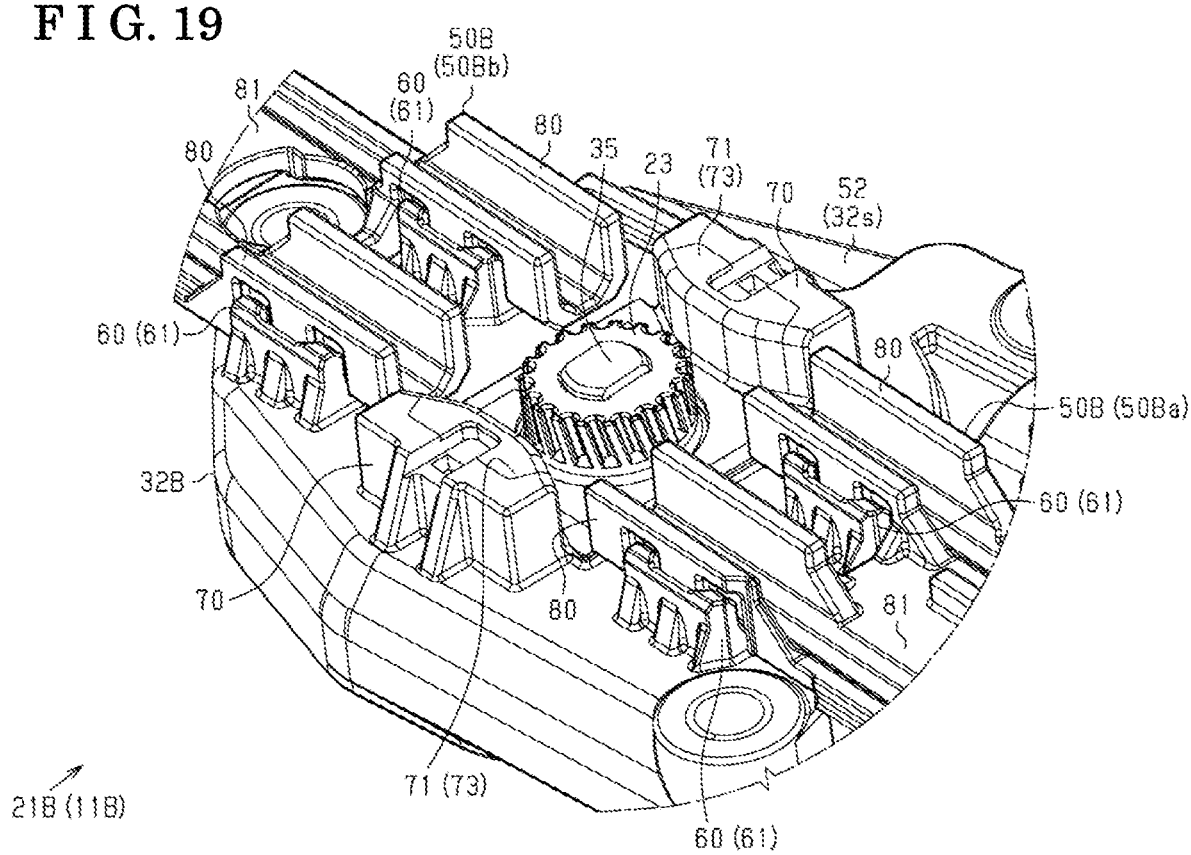
FIG. 19 is a perspective view of the vicinity of the guide member fixed to the arrangement surface of the drive gear according to a second embodiment disclosed here.
Figure 20:
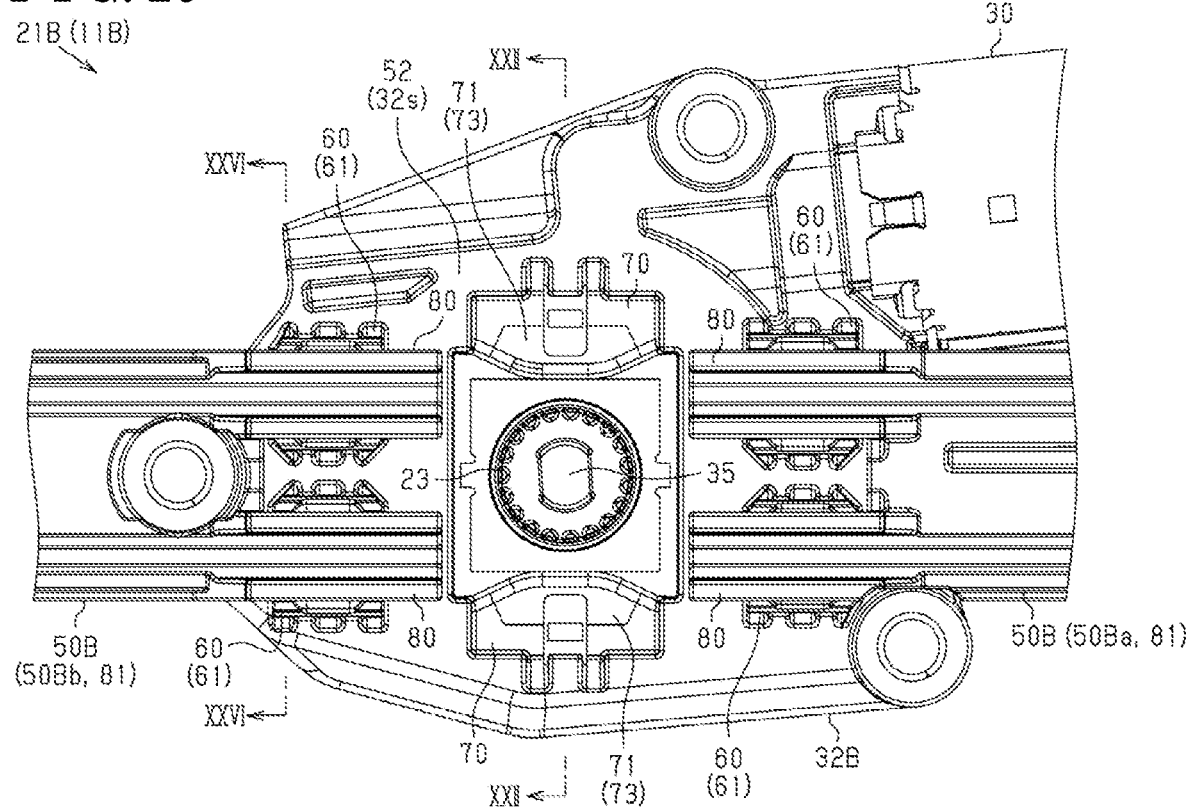
FIG. 20 is a plan view of the vicinity of the guide member fixed to the arrangement surface of the drive gear according to the second embodiment.

As illustrated in FIGS. 19 and 20, an actuator apparatus 21B of the second embodiment includes a guide member 50B of which a configuration differs from the configuration of the actuator apparatus 21 of the first embodiment.

Figure 21:
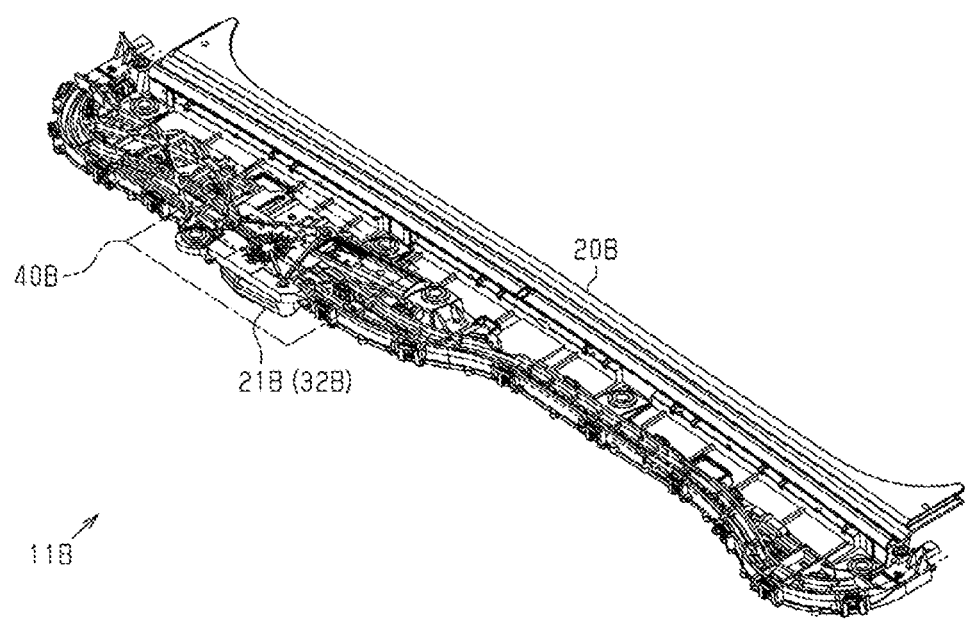
FIG. 21 is a perspective view of a front housing of the second embodiment.
Figure 22:
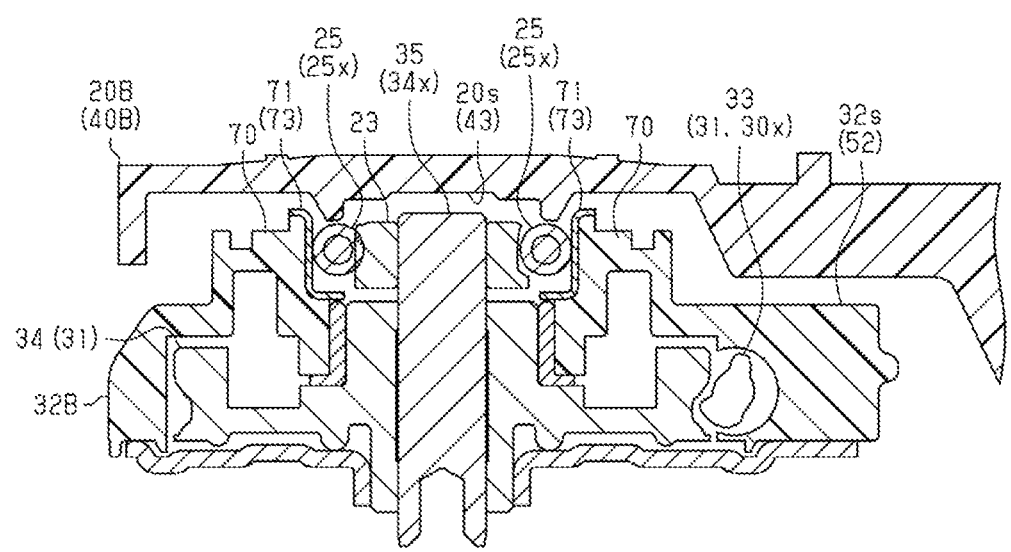
FIG. 22 is a cross-sectional view of the actuator apparatus of the second embodiment which is taken along line XXII-XXII in FIG. 20.
Figure 23:
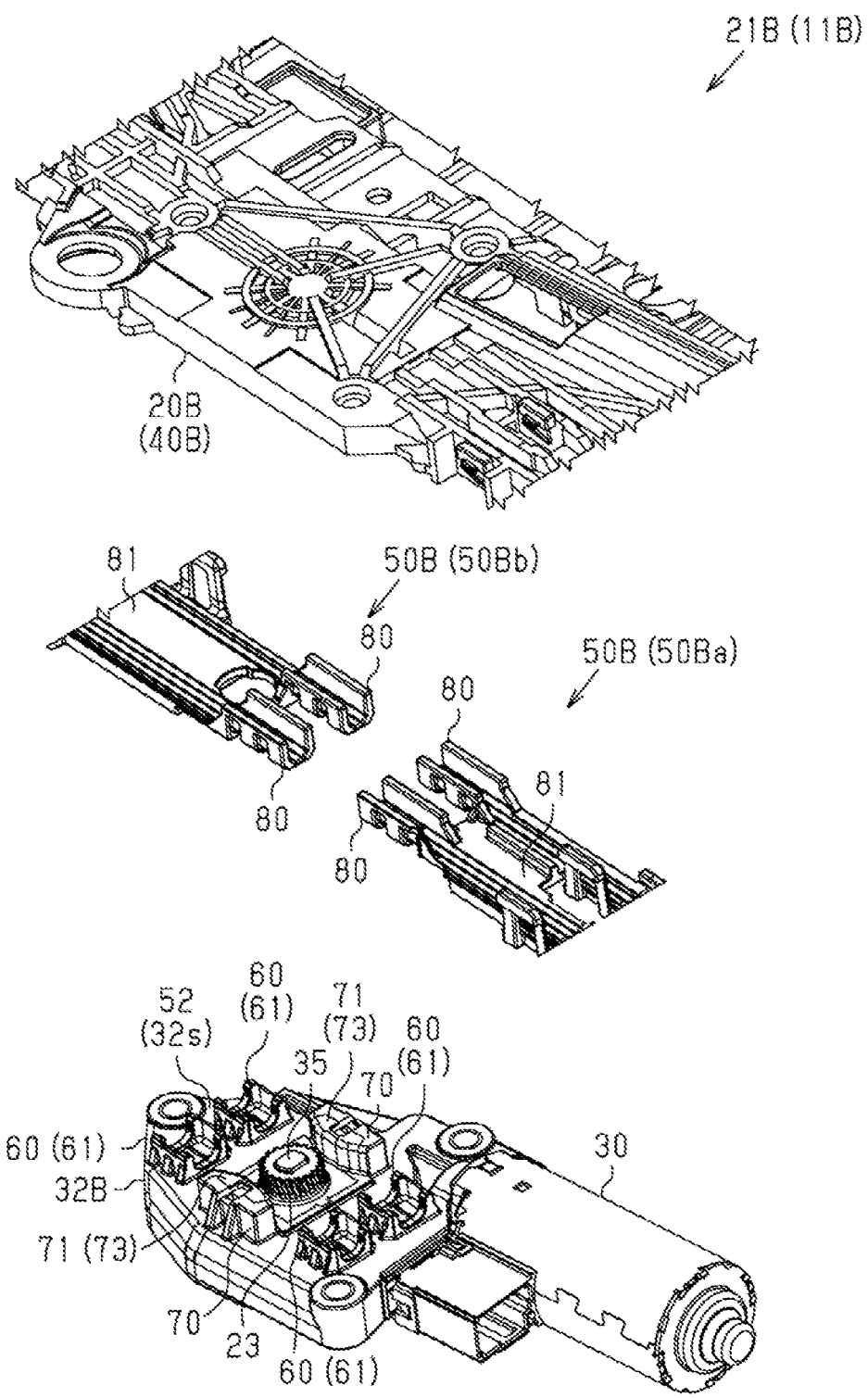
FIG. 23 is an exploded perspective view of the actuator apparatus of the second embodiment.

As illustrated in FIGS. 21 and 22, at a sunroof apparatus 11B of the second embodiment, a gear housing 32B is fixed to a front housing 20B (an example of the connecting housing), and thus a part of the front housing 20B functions as a cover member 40B covering the drive gear 23 exposed outside the gear housing 32B. In other words, the cover member 40B of the second embodiment is provided integrally with the front housing 20B. According also to the configuration of the actuator apparatus 21B of the second embodiment, when the gear housing 32B is to be fixed to the front housing 20B, the guide member 50B is held at a fixing surface 20s of the front housing 20B configuring the cover ember 40B before the assembly of gear housing 32B and the front housing 20B on each other.

In detail, as illustrated in FIGS. 19, 20, 23 and 24, the actuator apparatus 21B of the second embodiment includes guide members 50Ba, 50Bb formed as a left-and-right pair provided to sandwich therebetween the drive gear 23 (that protrudes from the gear housing 32B) in the arrangement or routing direction (the left and right direction in FIG. 20) of the drive cables 25, 25. Each of the guide members 50Ba and 50Bb includes guide portions 80, 80 arranged as a pair to be away from each other in the vehicle front and rear direction (the up and down direction in FIG. 20), and a base portion 81 connecting the guide portions 80 and 80 to each other, in a state where the actuator apparatus 21B is fixed to the front housing 20B. Specifically, at the actuator apparatus 21B of the second embodiment, each of the guide portions 80, 80 includes a substantially U-shaped cross section opening in the axial direction of the output shaft 35 that is orthogonal to the arrangement surface 52 of the drive gear 23, in an assembling direction of the gear housing 32B to the front housing 20B. The guide portions 80 and 80 are extended parallel to each other along a lengthwise direction of the front housing 20B, the lengthwise direction in which the drive cables 25, 25 are routed. At the actuator apparatus 21B of the second embodiment, also the base portion 81 of each of the guide members 50Ba and 50Bb is provided at the position that is farther from the drive gear 23 than the guide portion 80 so as to extend in the lengthwise direction of the front housing 20B. Each of the guide members 50Ba and 50Bb is configured such that the drive cables 25 and 25 are placed by insertion inside the guide portions 80 and 80 each having the substantially U-shaped cross section, and thus the drive cables 25 and 25 are guided to the meshing position at which the drive cables 25, 25 and the drive gear 23 mesh with each other.

In more detail, similarly to the gear housing 32 of the first embodiment, also at the gear housing 32B of the second embodiment, the plural fixing portions 60 each having the configuration as the press-fitting portion 61 are provided at the arrangement surface 52 of the drive gear 23. At the actuator apparatus 21B of the second embodiment, the guide portions 80, 80 of each of the guide members 50B fit in the fixing portions 60, and thus each of the guide members 50B is fixed to the arrangement surface 52 of the drive gear 23.

Figure 25:
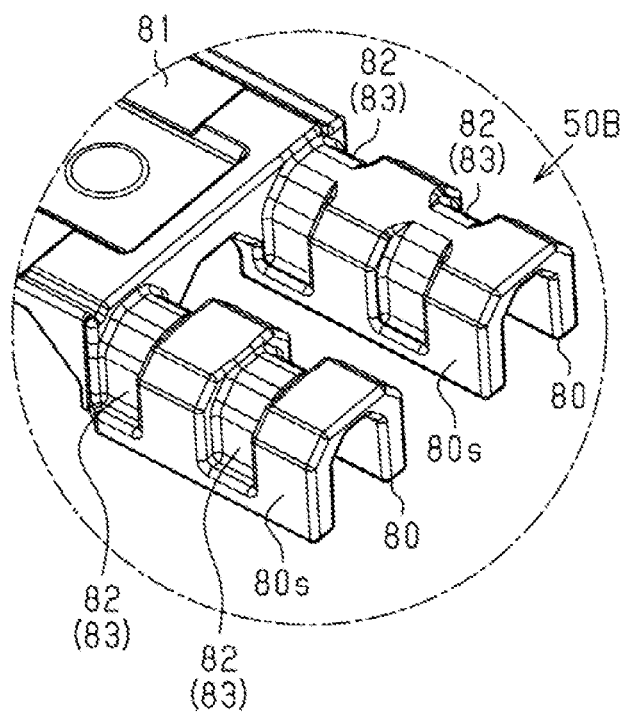
FIG. 25 is a perspective view of a guide portion provided at the guide member of the second embodiment.
Figure 26:
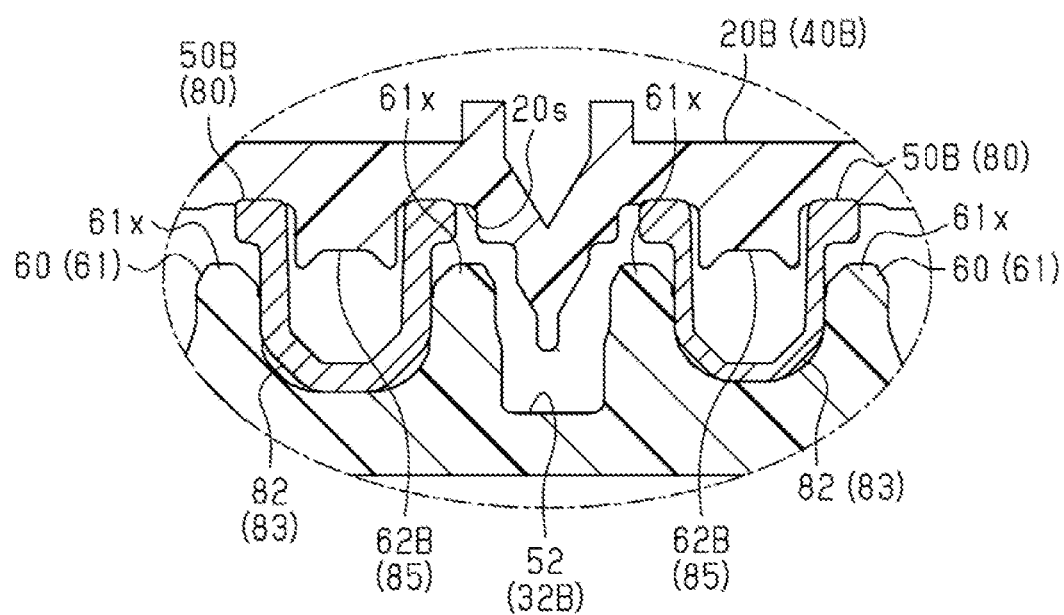
FIG. 26 is a cross-sectional view of the actuator apparatus of the second embodiment which is taken along line XXVI-XXVI in FIG. 20.

Specifically, as illustrated in FIGS. 25 and 26, at each of the guide members 50B of the second embodiment, two pieces of engagement groove 82, 82 are provided at an outer peripheral surface 80s of each of the guide portions 80, 80 so as to extend in a circumferential direction of the outer peripheral surface 80s. The engagement grooves 82, 82 are provided at positions corresponding to the two sets of pairs of engagement tabs 61x, 61x configuring the press-fitting portions 61 at the fixing portion 60 of a gear housing-side. That is, at the actuator apparatus 21B of the second embodiment, a thin portion 83 is press-fitted between the substantially U-shaped cross-sectional configuration formed by each pair of engagement tabs 61x, 61x. The thin portion 83 of each of the guide portions 80, 80 is formed or defined by each of the engagement grooves 82, 82. Thus, the actuator apparatus 21B includes the configuration in which the guide portions 80, 80 of each of the guide members 50B fit in the fixing portions 60 of the gear housing 32B in the assembling direction (the up and down direction in FIG. 26) in which the front housing 20B and the gear housing 32B are assembled on each other.

Figure 24:
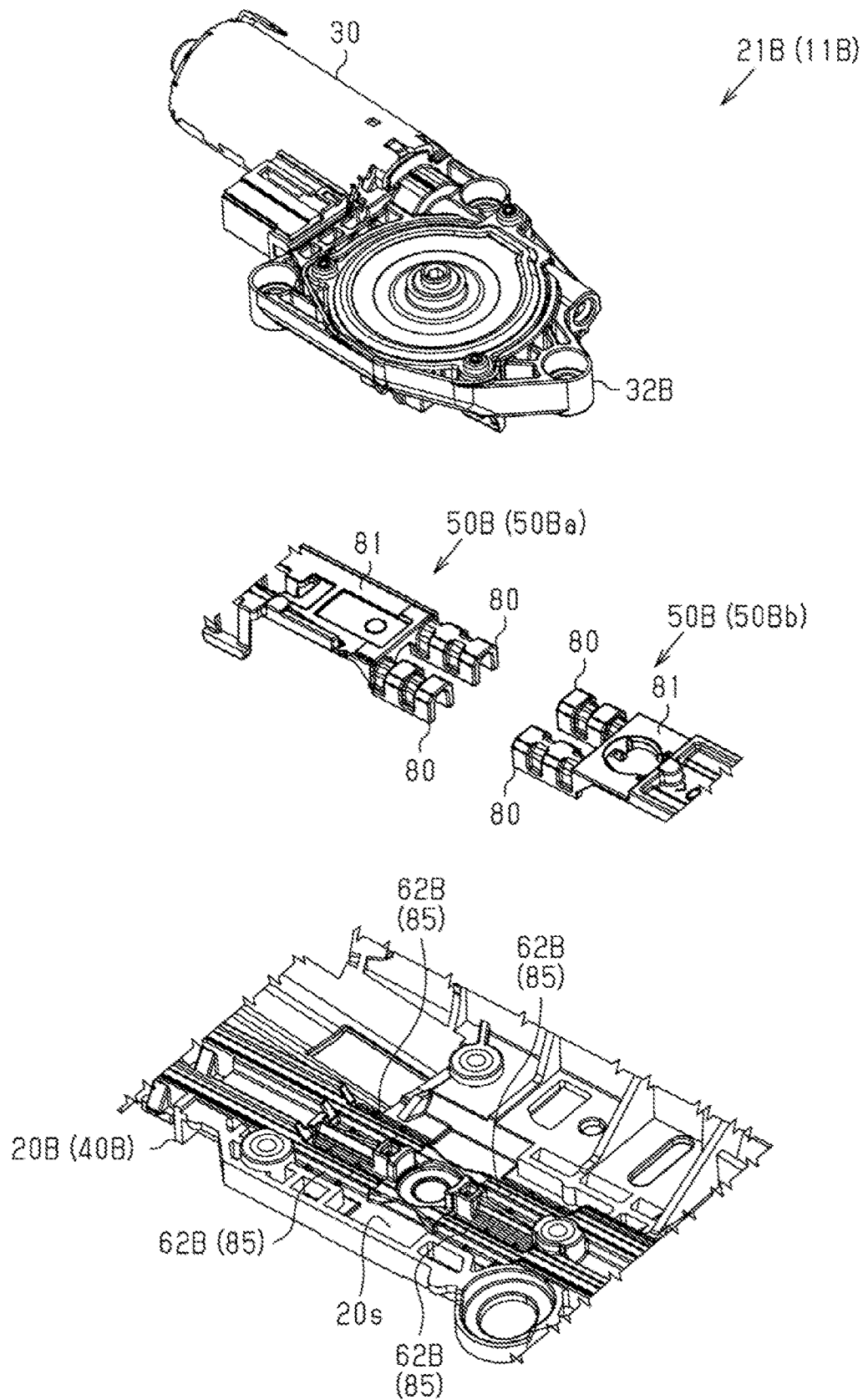
FIG. 24 is an exploded perspective view of the actuator apparatus of the second embodiment.
Figure 27:
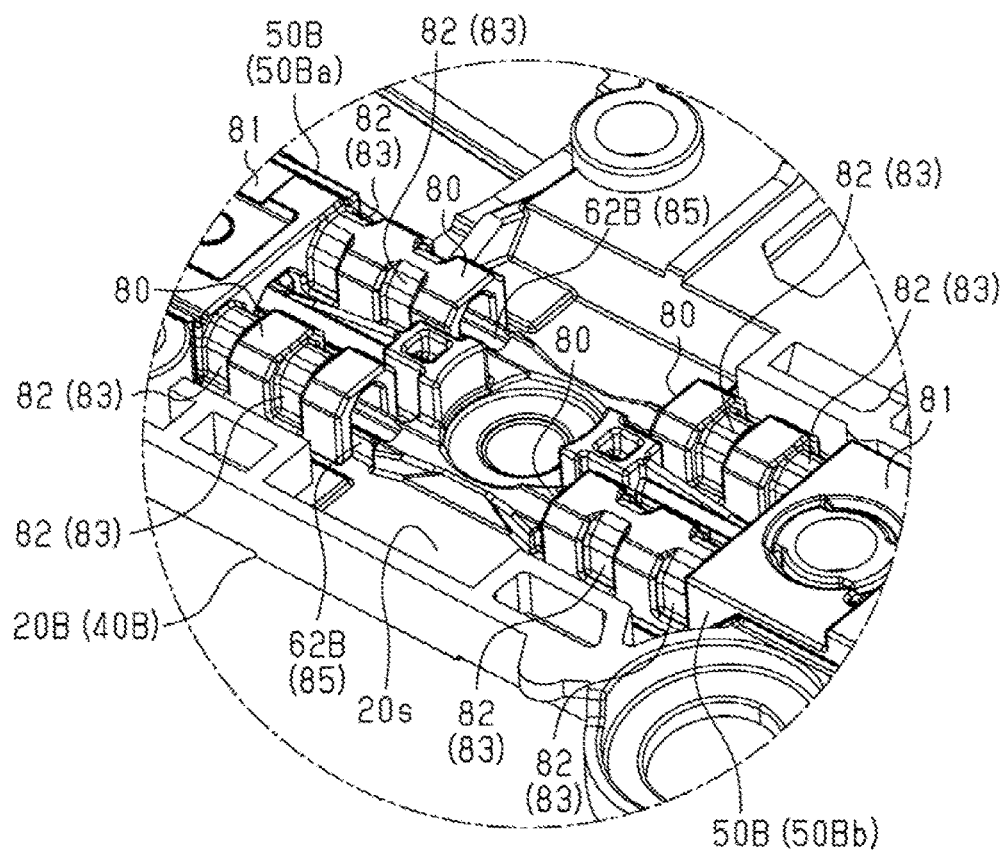
FIG. 27 is a perspective view of the guide member held at a fixing surface of the front housing configuring the cover member.
Figure 28:
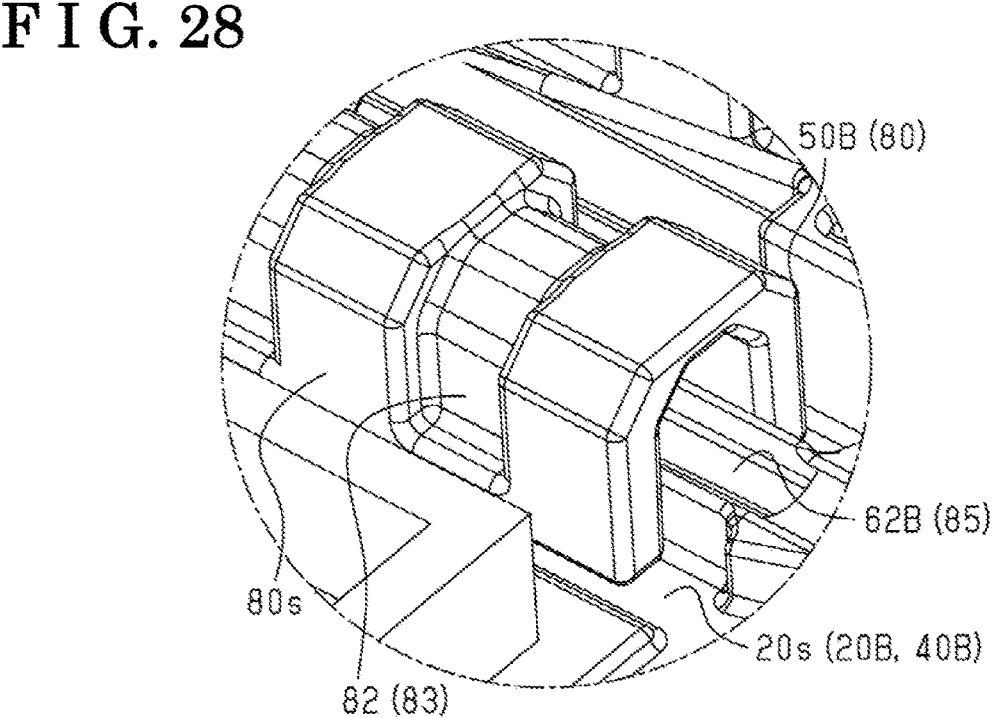
FIG. 28 is a perspective view of the vicinity of the guide portion of the guide member mating with the holding portion provided at the fixing surface of the front housing.

As illustrated in FIGS. 24, 27 and 28, at the sunroof apparatus 11B of the second embodiment, the fixing surface 20s of the front housing 20B configuring the cover member 40B includes plural protrusions 85 each formed in a shape of a ridge extending in the lengthwise direction of the front housing 20B. Specifically, the protrusions 85 are provided at positions at which the guide portions 80, 80 of each of the guide members 50B are arranged in a state where the actuator apparatus 21B is fixed to the front housing 20B. In fixing the gear housing 32B relative to the front housing 20B, the guide portions 80, 80 (each of which includes the substantially U-shaped cross-sectional configuration opening in the assembling direction) of each of the guide members 50B mate with the protrusions 85 before the assembly of the gear housing 32B and the front housing 20B on each other. At the sunroof apparatus 11B of the second embodiment, each of the protrusions 85 is configured to function as a holding portion 62B of the guide member 50B provided at a cover member-side.

That is, also at the actuator apparatus 21B of the second embodiment, before the gear housing 32B is assembled onto the front housing 20B including the configuration as the cover member 40B, the guide members 50B are allowed to mate or fit with the holding portions 62B provided at the fixing surface 20s of the front housing 20B (refer to FIG. 15, Step 101). Next, in a state in which each of the guide members 50B is positioned, the gear housing 32B is assembled onto the front housing 20B (refer to FIG. 15, Step 102). At this time, by using a force with which the fixing surface 20s at a front housing-side and the arrangement surface 52 at a gear housing-side are pushed or pressed against with each other, each of the guide portions 80, 80 of the guide members 50B held at the fixing surface 20s of the front housing 20B is allowed to fit in the fixing portion 60 (which includes the configuration as the press-fitting portion 61) of a gear housing-side (refer to FIG. 15, Step 103). Thus, also the actuator apparatus 21B of the second embodiment allows each of the guide members 50B to be fixed to the arrangement surface 52 of the drive gear 23 at the same time as when the cover member 40B is assembled onto the gear housing 32B.

As described above, according to the configuration of the second embodiment, the similar effects to the first embodiment can be obtained. Further, by allowing the front housing 20B to function as the cover member 40B, the configuration can be simplified. Accordingly, the assembling work is made easy, thereby reducing the manufacturing costs.

Each of the above-described embodiments can be implemented with the following changes or modifications. Each of the above-described embodiments and the following variations may be implemented by combining with each other or one another without creating technical contradictions or conflicts.

In each of the above-described embodiments, the sunroof apparatus 11 is embodied such that the drive force of the actuator apparatus 21 is transmitted to the sliding members 17, 17 via the drive cables 25, 25, and thus the sliding members 17, 17 are caused to move in a sliding manner along the guide rails 15, 15, and accordingly the movable panel 10 supported by the support members 13, 13 is allowed to open and close. However, the disclosure is not limited thereto and modification may be appropriately provided to the configuration in which the movable panel 10 is operated to open and close on the basis of the drive force of the actuator apparatus 21 that is transmitted via the drive cables 25, 25.

In each of the above-described configurations, the actuator apparatus 21 is provided at the front housing 20 serving as the connecting housing that connects the left-and-right pair of guide rails 15 and 15 to each other at the vehicle front-side positon of the roof panel 2. However, the disclosure is not limited thereto and a configuration may be embodied in which the actuator apparatus 21 is provided at a rear housing that connects rear end portions of the respective guide rails 15 and 15 to each other. The disclosure is applicable to a shade apparatus causing a shading member to operate to open and close, by transmitting the drive force via the drive cable 25.

For example, the disclosure is applicable to a configuration for operating to open and close other opening and closing member including a window regulator that raises and lowers a window of a vehicle, for example. The disclosure is applicable to other use than the opening and closing member drive apparatus, including a slope apparatus at which a slope plate is deployed and retracted at a lower edge of a door opening portion, for example.

Shapes and configurations of the gear housing 32, the cover member 40 and the guide member 50 may be appropriately changed. The fixing configuration of the guide member 50 relative to the arrangement surface 52 of the drive gear 23 is not limited to the press-fitting, and may be arbitrarily changed to other configuration including a screwing, for example. The holding configuration in which the guide member 50 is held by the cover member 40 may also be arbitrarily changed.

According to the aforementioned embodiments, an actuator apparatus 21, 21B includes a gear housing 32, 32B including an arrangement surface 52 of a drive gear 23 and the arrangement surface 52 is provided at an outer side of the gear housing 32, 32B. The actuator apparatus 21, 21B includes a cover member 40, 40B fixed to the gear housing 32, 32B in a state of covering the drive gear 23. The actuator apparatus 21, 21B includes a guide member 50, 51, 51a, 51b, 51c, 51d, 50B, 50Ba, 50Bb of a drive cable 25 meshing with the drive gear 23. The guide member 50, 51, 51a, 51b, 51c, 51d, 50B, 50Ba, 50Bb is provided to extend in an arrangement direction of the drive cable 25. The actuator apparatus 21, 21B includes a fixing portion 60 provided at the arrangement surface 52 and configured to fix the guide member 50, 51, 51a, 51b, 51c, 51d, 50B, 50Ba, 50Bb relative to the gear housing 32, 32B.

According to the above-described configuration, the arrangements of the guide member 50, 51, 51a, 51b, 51c, 51d, 50B, 50Ba, 50Bb relative to the drive gear 23 are not easily displaced or deviated. Thus, the guide member 50, 51, 51a, 51b, 51c, 51d, 50B, 50Ba, 50Bb and the drive cable 25 are prevented from interfering with each other.

According to the disclosure, the interference of the guide member 50, 51, 51a, 51b, 51c, 51d, 50B, 50Ba, 50Bb and the drive cable 25 with each other can be prevented from occurring.

According to the aforementioned embodiments, the fixing portion 60 corresponds to a press-fitting portion 61 opening in an assembling direction of the cover member 40, 40B relative to the gear housing 32, 32B, and the cover member 40, 40B includes a holding portion 62, 62B configured to position the guide member 50, 51, 51a, 51b, 51c, 51d, 50B, 50Ba, 50Bb relative to the press-fitting portion 61 by holding the guide member 50, 51, 51a, 51b, 51c, 51d, 50B, 50Ba, 50Bb.

According to the above-described configuration, the guide members 50, 51, 51a, 51b, 51c, 51d, 50B, 50Ba, 50Bb can be fixed to the arrangement surface 52 of the drive gear 23 at the same time as when the cover member 40, 40B is assembled onto the gear housing 32. This allows the assembling work to be easier, thereby reducing the manufacturing costs.

According to the aforementioned embodiments, the actuator apparatus 21, 21B includes a sliding-contact member 71 provided at a position at which the sliding-contact member 71 sandwiches a meshing portion 25x of the drive cable 25 between the sliding-contact member 71 and the drive gear 23. The meshing portion 25x meshes with the drive gear 23. The gear housing 32, 32B corresponds to a resin molded part and the sliding-contact member 71 corresponds to an insert member 73 formed integrally with the gear housing 32, 32B.

According to the above-described configuration, by forming the sliding-contact member 71 to be integral with the gear housing 32, 32B via the insert-molding, the assembling work can be simplified and the manufacturing costs may be reduced. Further, since the sliding-contact member 71 is integral with the gear housing 32, 32B, the retaining surface 70s for the drive cable 25 which is high in stability and rigidity is formed. Accordingly, by taking advantage of that the displacement or deviation between the guide members 50, 51, 51a, 51b, 51c, 51d, 50B, 50Ba, 50Bb of the drive cables 25, 25 and the drive gear 23 is little, the satisfactory meshing state is ensured.

According to the aforementioned second embodiment, the guide member 50, 51, 51a, 51b, 51c, 51d, 50B, 50Ba, 50Bb is configured to guide the drive cable 25 to a lengthwise-direction end portion of a guide rail 15. The guide rail 15 is provided as a pair to be arranged apart from each other. The cover member 40B is provided integrally with a front housing (i.e. connecting housing) 20B configured to connect the guide rails 15, 15 to each other.

According to the above-described configuration, the configuration of the apparatus can be simplified. Accordingly, the assembling work is made easy, thereby reducing the manufacturing costs.

According to the aforementioned embodiments, a sunroof apparatus 11, 11B includes an actuator apparatus 21, 21B which includes a gear housing 32, 32B including an arrangement surface 52 of a drive gear 23 and the arrangement surface 52 is provided at an outer side of the gear housing 32, 32B. The actuator apparatus 21, 21B includes a cover member 40, 40B fixed to the gear housing 32, 32B in a state of covering the drive gear 23. The actuator apparatus 21, 21B includes a guide member 50, 51, 51a, 51b, 51c, 51d, 50B, 50Ba, 50Bb of a drive cable 25 meshing with the drive gear 23. The guide member 50, 51, 51a, 51b, 51c, 51d, 50B, 50Ba, 50Bb is provided to extend in an arrangement direction of the drive cable 25. The actuator apparatus 21, 21B includes a fixing portion 60 provided at the arrangement surface 52 and configured to fix the guide member 50, 51, 51a, 51b, 51c, 51d, 50B, 50Ba, 50Bb relative to the gear housing 32, 32B.

According to the above-described configuration, the guide member 50, 51, 51a, 51b, 51c, 51d, 50B, 50Ba, 50Bb and the drive cable 25 are prevented from interfering with each other, and thus a high quietness is obtained.

According to the aforementioned embodiments, a manufacturing method of an actuator apparatus 21, 21B includes assembling a cover member 40, 40B relative to a gear housing 32, 32B, the gear housing 32, 32B including an arrangement surface 52 of a drive gear 23, the arrangement surface 52 being provided at an outer side of the gear housing 32, 32B, and the cover member 40, 40B being configured to cover the drive gear 23. The method includes fixing a guide member 50, 51, 51a, 51b, 51c, 51d, 50B, 50Ba, 50Bb of a drive cable 52 to the arrangement surface 52, the drive cable 25 meshing with the drive gear 23, the guide member 50, 51, 51a, 51b, 51c, 51d, 50B, 50Ba, 50Bb being provided to extend in an arrangement direction of the drive cable 25, wherein the arrangement surface 52 is provided with a press-fitting portion 61 opening in an assembling direction of the cover member 40, 40B relative to the gear housing 32, 32B, the press-fitting portion serves as a fixing portion 60 configured to fix the guide member 50, 51, 51a, 51b, 51c, 51d, 50B, 50Ba, 50Bb to the arrangement surface 52. The method includes holding the guide member 50, 51, 51a, 51b, 51c, 51d, 50B, 50Ba, 50Bb at the cover member 40, 40B before the gear housing 32, 32B and the cover member 40, 40B are assembled to each other, and pressing the guide member 50, 51, 51a, 51b, 51c, 51d, 50B, 50Ba, 50Bb, which has been positioned by being held by the cover member 40, 40B, into the press-fitting portion 61, when assembling the gear housing 32 32B and the cover member 40, 40B to each other.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An actuator apparatus comprising:
   a drive gear disposed on a rotatably driven shaft;
   a gear housing including an arrangement surface for the drive gear, the arrangement surface being provided at an outer side of the gear housing, and the rotatable driven shaft extending through an opening defined by the gear housing;
   a cover member fixed to the gear housing in a state of covering the drive gear;
   a guide member of a drive cable meshing with the drive gear, the guide member being provided to extend in an arrangement direction of the drive cable; and
   a fixing portion provided at the arrangement surface and configured to fix the guide member relative to the gear housing,
   wherein
   the fixing portion corresponds to a press-fitting portion opening in an assembling direction of the cover member relative to the gear housing,
   the cover member includes a holding portion configured to position the guide member relative to the press-fitting portion by holding the guide member, and
   the holding portion and the press-fitting portion are configured such that a holding force applied by the holding portion to the guide member is less than a fitting force applied by the press-fitting portion to the guide member.

2. The actuator apparatus according to claim 1, comprising:
   a sliding-contact member provided at a position at which the sliding-contact member sandwiches a meshing portion of the drive cable between the sliding-contact member and the drive gear, the meshing portion meshing with the drive gear, wherein
   the gear housing corresponds to a resin molded part, and
   the sliding-contact member corresponds to an insert member formed integrally with the gear housing.

3. The actuator apparatus according to claim 2, wherein
   the guide member is configured to guide the drive cable to a lengthwise-direction end portion of a guide rail, and
   the guide rail is provided as a pair to be arranged apart from each other, and the cover member is provided integrally with a connecting housing configured to connect the guide rails to each other.

4. The actuator apparatus according to claim 1, wherein
   the guide member is configured to guide the drive cable to a lengthwise-direction end portion of a guide rail, and
   the guide rail is provided as a pair to be arranged apart from each other, and the cover member is provided integrally with a connecting housing configured to connect the guide rails to each other.

5. The actuator apparatus according to claim 1, wherein the fixing portion comprises a pair of engagement tabs, and the the holding portion is configured to position the guide member relative to the engagement tabs by holding the guide member, the holding portion comprising a holding tab configured to be disposed in-between the pair of engagement tabs.

6. A sunroof apparatus comprising an actuator apparatus, the actuator apparatus including:
   a drive gear disposed on a rotatably driven shaft;
   a gear housing including an arrangement surface for the drive gear, the arrangement surface being provided at an outer side of the gear housing, and the rotatable driven shaft extending through an opening defined by the gear housing;
   a cover member fixed to the gear housing in a state of covering the drive gear;
   a guide member of a drive cable meshing with the drive gear, the guide member being provided to extend in an arrangement direction of the drive cable; and
   a fixing portion provided at the arrangement surface and configured to fix the guide member relative to the gear housing,
   wherein the fixing portion comprises a pair of engagement tabs, and the cover member includes a holding portion configured to position the guide member relative to the engagement tabs by holding the guide member, the holding portion comprising a holding tab configured to be disposed in-between the pair of engagement tabs.

7. The sunroof apparatus according to claim 6, wherein the fixing portion corresponds to a press-fitting portion opening in an assembling direction of the cover member relative to the gear housing.

8. The sunroof apparatus according to claim 6, wherein the actuator apparatus includes;
   a sliding-contact member provided at a position at which the sliding-contact member sandwiches a meshing portion of the drive cable between the sliding-contact member and the drive gear, the meshing portion meshing with the drive gear, wherein
   the gear housing corresponds to a resin molded part, and
   the sliding-contact member corresponds to an insert member formed integrally with the gear housing.

9. The sunroof apparatus according to claim 6, wherein
   the guide member is configured to guide the drive cable to a lengthwise-direction end portion of a guide rail, and
   the guide rail is arranged as a pair to be apart from each other, and the cover member is provided integrally with a connecting housing configured to connect the guide rails to each other.

10. A manufacturing method of an actuator apparatus including a drive gear disposed on a rotatably driven shaft, the method comprising:
    assembling a cover member relative to a gear housing, the gear housing including an arrangement surface for the drive gear, the arrangement surface being provided at an outer side of the gear housing, the rotatable driven shaft extending through an opening defined by the gear housing, and the cover member being configured to cover the drive gear;
    fixing a guide member of a drive cable to the arrangement surface, the drive cable meshing with the drive gear, the guide member being provided to extend in an arrangement direction of the drive cable, wherein
    the arrangement surface is provided with a press-fitting portion opening in an assembling direction of the cover member relative to the gear housing, the press-fitting portion serves as a fixing portion configured to fix the guide member to the arrangement surface, the method comprising:
    holding the guide member at the cover member before the gear housing and the cover member are assembled to each other; and
    pressing the guide member, which has been positioned by being held by the cover member, into the press-fitting portion when assembling the gear housing and the cover member to each other,
    wherein a holding portion of the cover member and the press fitting portion are configured such that a holding force applied by the holding portion to the guide member is less than a fitting force applied by the pressing fitting portion to the guide member.

11. A sunroof apparatus comprising an actuator apparatus, the actuator apparatus including:
    a drive gear disposed on a rotatably driven shaft;
    a gear housing including an arrangement surface for the drive gear, the arrangement surface being provided at an outer side of the gear housing, and the rotatable driven shaft extending through an opening defined by the gear housing;
    a cover member fixed to the gear housing in a state of covering the drive gear;
    a guide member of a drive cable meshing with the drive gear, the guide member being provided to extend in an arrangement direction of the drive cable; and
    a fixing portion provided at the arrangement surface and configured to fix the guide member relative to the gear housing,
    wherein
    the fixing portion corresponds to a press-fitting portion opening in an assembling direction of the cover member relative to the gear housing,
    the cover member includes a holding portion configured to position the guide member relative to the press-fitting portion by holding the guide member, and
    the holding portion and the press-fitting portion are configured such that a holding force applied by the holding portion to the guide member is less than a fitting force applied by the press-fitting portion to the guide member.

\* \* \* \* \*